US012383775B2

(12) United States Patent
Murray et al.

(10) Patent No.: US 12,383,775 B2
(45) Date of Patent: Aug. 12, 2025

(54) STOVETOP FIRE SUPPRESSION SYSTEM AND METHOD

(71) Applicants: WilliamsRDM, Inc., Fort Worth, TX (US); Cindy J. Anthony, River Oaks, TX (US)

(72) Inventors: Donald W. Murray, Santo, TX (US); Richard M. Anthony, River Oaks, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 531 days.

(21) Appl. No.: 17/205,758

(22) Filed: Mar. 18, 2021

(65) Prior Publication Data

US 2021/0290995 A1 Sep. 23, 2021

Related U.S. Application Data

(60) Provisional application No. 63/062,920, filed on Aug. 7, 2020, provisional application No. 62/992,716, filed on Mar. 20, 2020.

(51) Int. Cl.
*A62C 3/00* (2006.01)
*A62C 99/00* (2010.01)

(52) U.S. Cl.
CPC .......... *A62C 3/006* (2013.01); *A62C 99/0045* (2013.01)

(58) Field of Classification Search
CPC ......... A62C 3/006; A62C 35/02; A62C 35/04; A62C 99/0045
USPC ....................................................... 169/65, 26
See application file for complete search history.

(56) References Cited

U.S. PATENT DOCUMENTS

| | | | | | |
|---|---|---|---|---|---|
| 3,209,837 | A * | 10/1965 | Freedman | A62C 2/10 169/65 |
| 6,276,461 | B1 * | 8/2001 | Stager | A62C 3/006 169/65 |
| 7,610,966 | B1 * | 11/2009 | Weintraub | A62C 99/0045 169/59 |
| 8,561,712 | B2 * | 10/2013 | McKim | A62C 3/006 169/65 |
| 9,044,627 | B1 * | 6/2015 | Williams | A62C 3/006 |
| 9,440,101 | B2 * | 9/2016 | Procious | A62C 37/12 |
| 9,604,081 | B1 * | 3/2017 | Scarola | A62C 35/13 |
| 10,821,312 | B2 * | 11/2020 | Scarola | A62C 35/13 |
| 10,994,162 | B2 * | 5/2021 | Murray | A62C 35/10 |

(Continued)

*Primary Examiner* — Joseph A Greenlund
(74) *Attorney, Agent, or Firm* — Foley & Lardner LLP

(57) ABSTRACT

A stovetop fire suppression system for selectively releasing a fire suppressant powder onto a stovetop first or second burner. The stovetop fire suppression system includes a base member and a chute member secured to the base member at opposed first and second ends of the base member. The chute member is movable between a storage position and a dispensing position. The suppression system further includes a first actuating member disposed at the base section first end and a second actuating member disposed at the base section second end. In response to actuation of the first actuating member, the chute member is movable the dispensing position to release the fire suppressant powder onto the first burner, and in response to actuation of the second actuating member, the chute member moves to the dispensing position to release the fire suppressant powder onto the second burner.

20 Claims, 24 Drawing Sheets

(56) References Cited

U.S. PATENT DOCUMENTS

| | | | | |
|---|---|---|---|---|
| 2002/0112863 A1* | 8/2002 | Padgett | A62C 3/006 169/56 |
| 2007/0215363 A1* | 9/2007 | McKim | A62C 3/006 169/65 |
| 2014/0076588 A1* | 3/2014 | Procious | A62C 35/13 169/52 |
| 2017/0157440 A1* | 6/2017 | Scarola | A62C 37/00 |
| 2019/0255371 A1* | 8/2019 | Scarola | A62C 37/08 |
| 2021/0290995 A1* | 9/2021 | Murray | A62C 99/0045 |

* cited by examiner

STOVETOP FIRE SUPPRESSION SYSTEM AND METHOD

CROSS-REFERENCE TO RELATED APPLICATIONS

This application claims the benefit of and priority to U.S. Prov. Pat. App. No. 62/992,716 filed on Mar. 20, 2020, and entitled "Stovetop Fire Suppression System and Method," and U.S. Prov. Pat. App. No. 63/062,920 filed on Aug. 7, 2020, and entitled "Stovetop Fire Suppression System and Method," the disclosures of which are hereby incorporated by reference in their entirety.

TECHNICAL FIELD

The present disclosure relates to a system and method for suppressing and extinguishing fires, and in particular, to an apparatus and method for mountable to a wall adjacent or near a stovetop cooking surface for suppressing and extinguishing kitchen stovetop fires.

BACKGROUND

In a kitchen, dangers are posed by fires originating from overheating of grease or oils during cooking. For example, a pan of grease on a stove burner can become so hot that it ignites. Not only does it pose a risk to individuals working in the area around the stove, but oftentimes, if not extinguished quickly, damage to the stove and the surrounding building structure can occur. This is especially true during circumstances where the stove is unattended. In this situation, considerable damage and devastation can occur, including the surrounding building structure becoming engulfed in flames.

In order to reduce the risk of household fires, fire suppression devices have been devised to automatically release a powder to suppress a stovetop fire, at least in part by smothering flames. Such a device is effective to put out a stovetop flame. Many designs have been proposed and used for extinguishing stovetop fires. However, such solutions are oftentimes difficult to install, are large, bulky, obstruct or otherwise block access to cooking surfaces, and are unable to store and/or precisely direct a sufficient amount of fire suppressant powder to extinguish a stovetop fire. It would be advantageous in the marketplace to address these and other deficiencies associated with current stovetop fire suppression devices

SUMMARY

According to a first aspect, there is provided stovetop fire suppression system for selectively releasing a fire suppressant powder onto a stovetop first or second burner. The stovetop fire suppression system includes a base member and a chute member secured to the base member at opposed first and second ends of the base member. The chute member is movable between a storage position, whereby the chute member and the base member form a storage area for storing the fire suppressant powder therein, and a dispensing position, whereby the chute member is positioned to release the fire suppressant powder from the storage area. The system further includes a first actuation member disposed at the base section first end and a second actuation member disposed at the base section second end. In response to actuation of the first actuation member, the chute member is movable the dispensing position to release the fire suppressant powder onto the first burner, and in response to actuation of the second actuation member, the chute member is moveable to the dispensing position to release the fire suppressant powder onto the second burner.

According to second aspect, there is provided a stovetop fire suppression system for selectively releasing a fire suppressant powder onto a stovetop first or second burner. The system includes base member having a top wall, a front wall, a rear wall, and a pair of sidewalls extending between the front and rear walls. The system also includes a chute member secured to the base member, the base member and the chute member forming a storage area for storing the fire suppressant powder. A first hinge is rotatably secured to the base member adjacent the base member front wall and a second hinge rotatably secured to the base member adjacent the base member rear wall. The chute member is secured to the first hinge and the second hinge at each respective end of the chute member; The system further includes a first actuation member disposed adjacent the base section front wall and a second actuation member disposed adjacent the base section rear wall such that in response to actuation of the first actuation member, the chute member moves to the dispensing position to release the fire suppressant powder onto the first burner, and in response to actuation of the second actuation member, the chute member moves to the dispensing position to release the fire suppressant powder onto the second burner.

According to third aspect, there is provided a method for suppressing a stovetop fire. The method includes providing a stovetop fire suppression system, the fire suppression system including a fire suppressant powder disposed within a storage area. The method further includes positioning the stovetop fire suppression system above a first burner and a second burner and securing stovetop fire suppression system to a support surface above the first burner and the second burner. The stovetop fire suppression system includes a first actuation member on a first end of the storage area and a second actuation member on an opposed second end of the storage area, the fire suppression system selectively releases the fire suppressant powder onto the first burner or the second burner in response to actuation of the first actuation member or the second actuation member, respectively.

DESCRIPTION OF THE FIGURES

The accompanying drawings facilitate an understanding of the various embodiments.

FIGS. **4*a* and 4*b*** are illustrations of portion of the track and stop system for the extension member.

Figure 3:
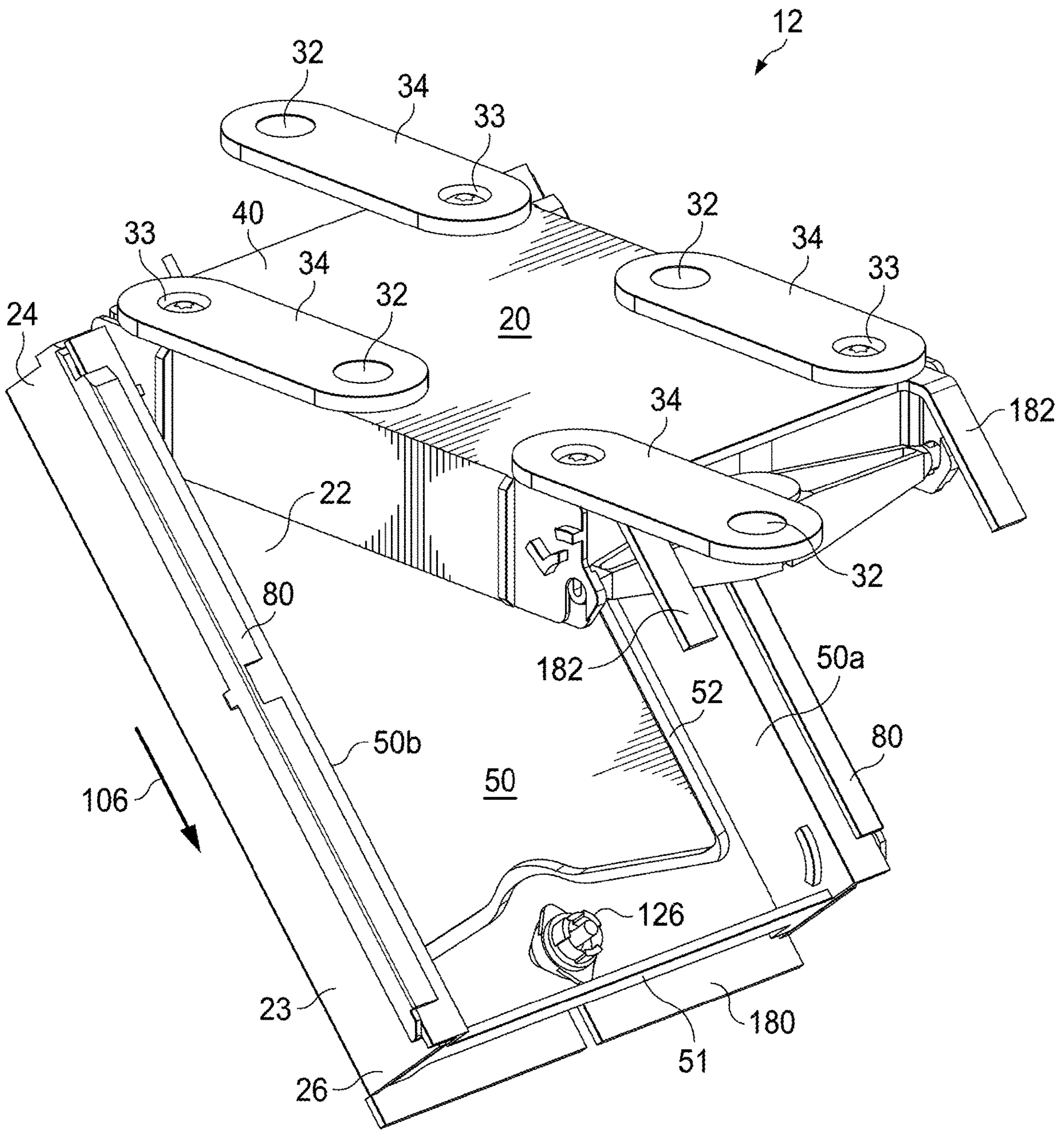
FIG. 3 is a rear perspective view of the stovetop fire suppression system of FIGS. 1 and 2 in a dispensing position.
Figure 4:
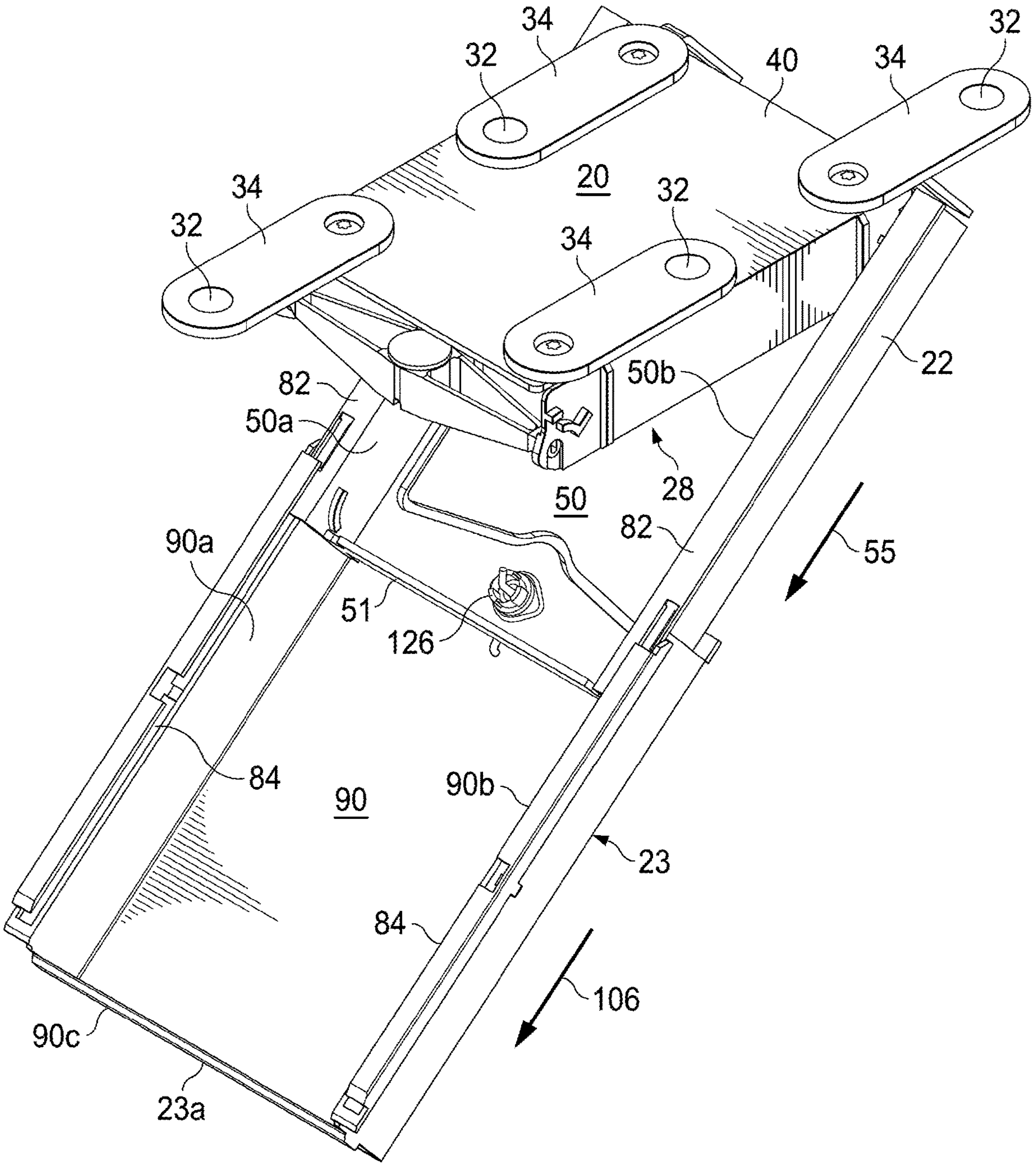
FIG. 4 is a front perspective view of the stovetop fire suppression system of FIGS. 1-3 in the dispensing position illustrating an extension member.
Figure 5:
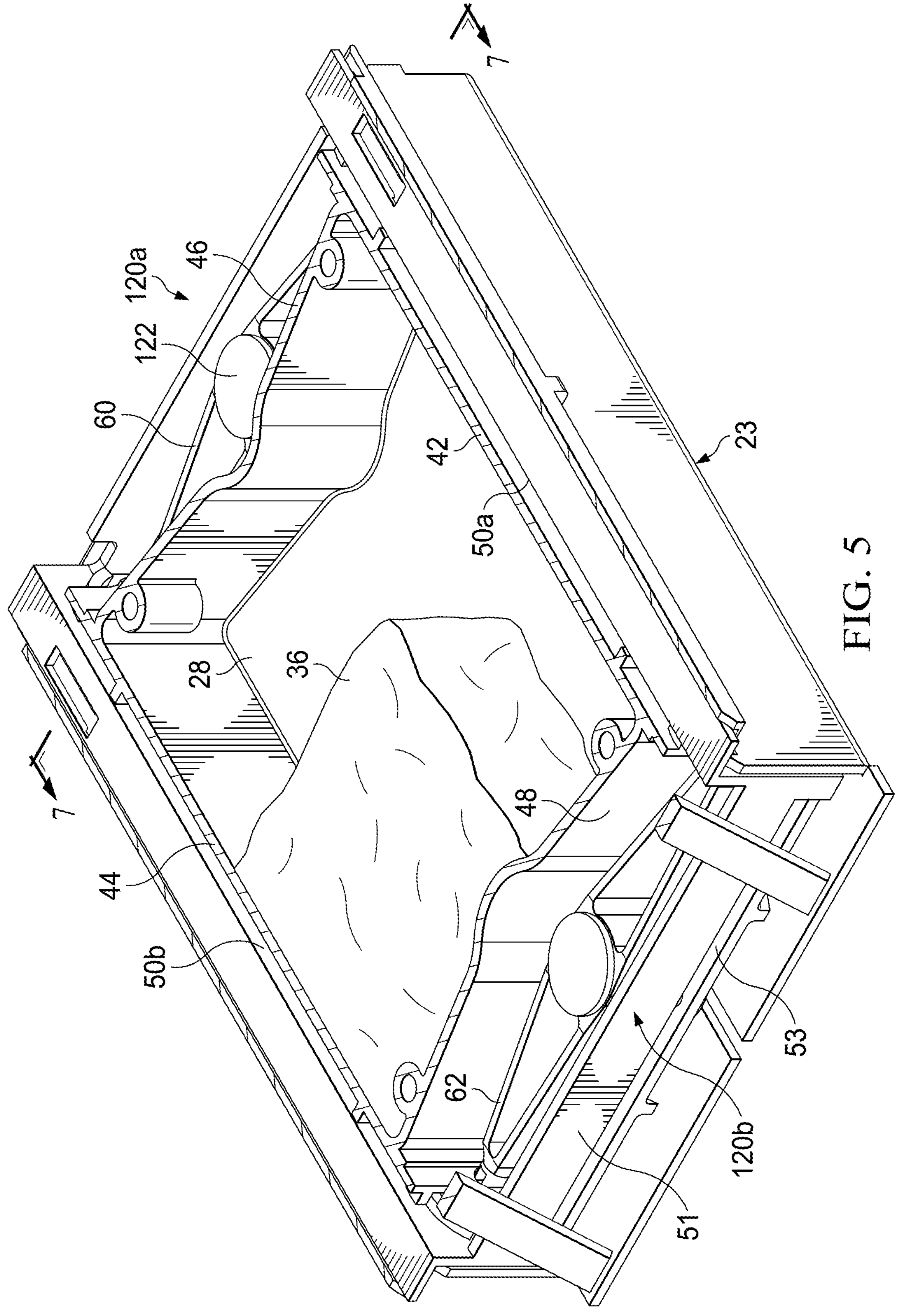

FIG. 5 is a rear perspective view of the stovetop fire suppression system of FIGS. 1-4 illustrating a fire suppression powder stored in a storage area.

Figure 6:
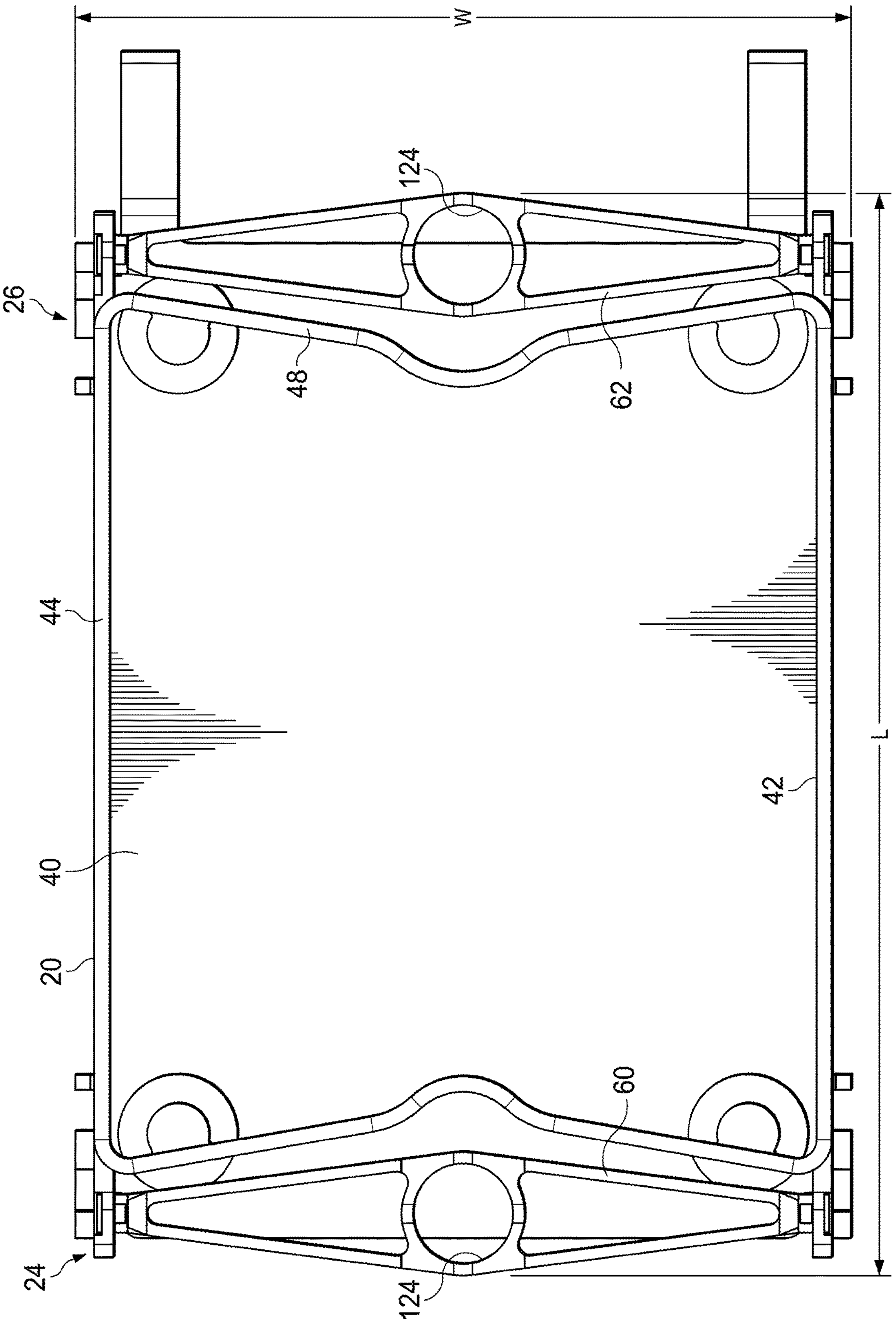

FIG. 6 is a bottom interior view of a base member of the fire suppression system of FIGS. 1-5.

Figure 7:
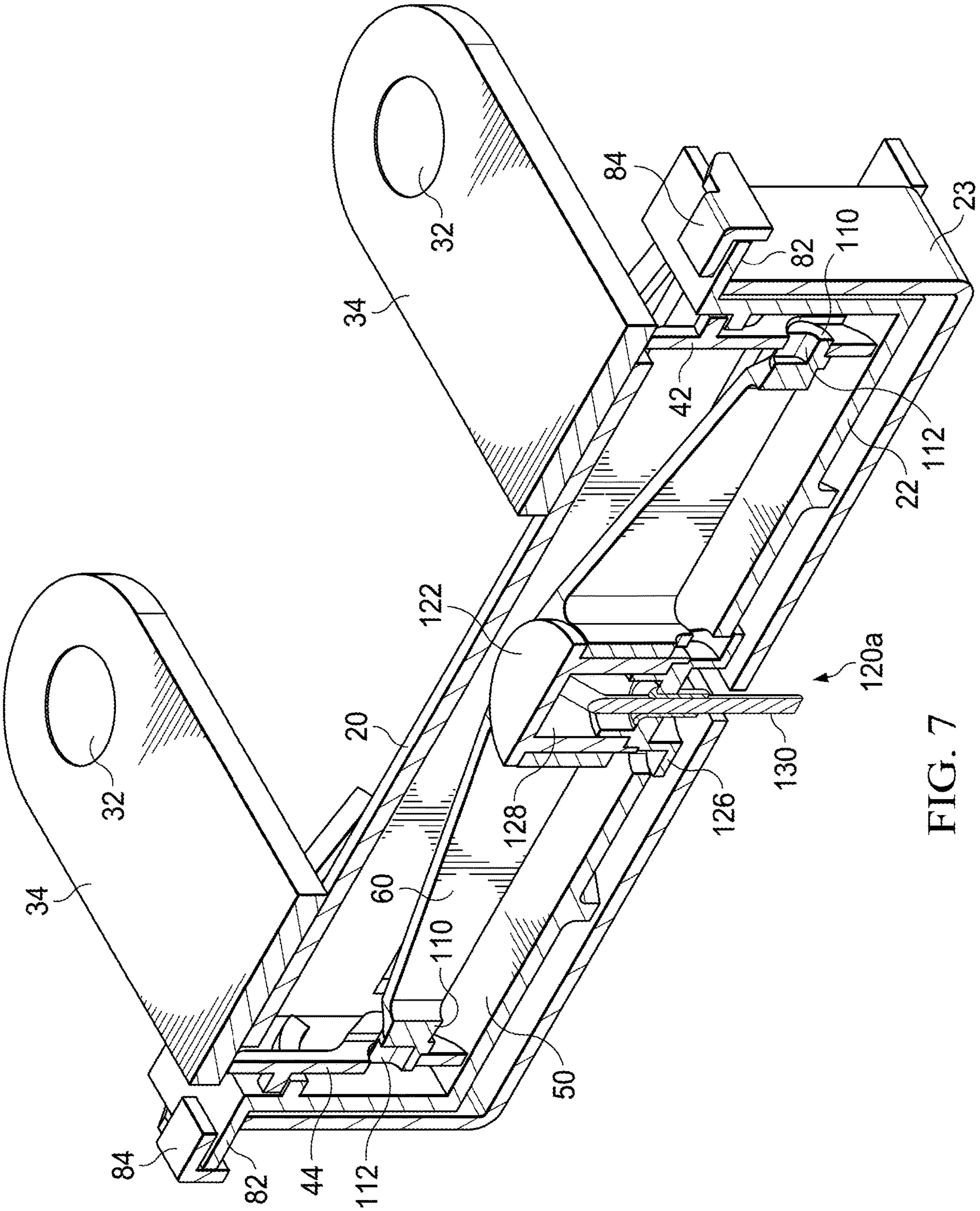

FIG. 7 is a section view of the fire suppression system taken along the line 7-7 of FIG. 5.

FIGS. 8-11 are illustrations of a section view of the fire suppression system of FIGS. 1-7 in the storage and dispensing positions.

FIGS. 12-14*a* are illustrations of the rotation stop and retaining system of the fire suppression system of FIGS. 1-11.

Figure 14:
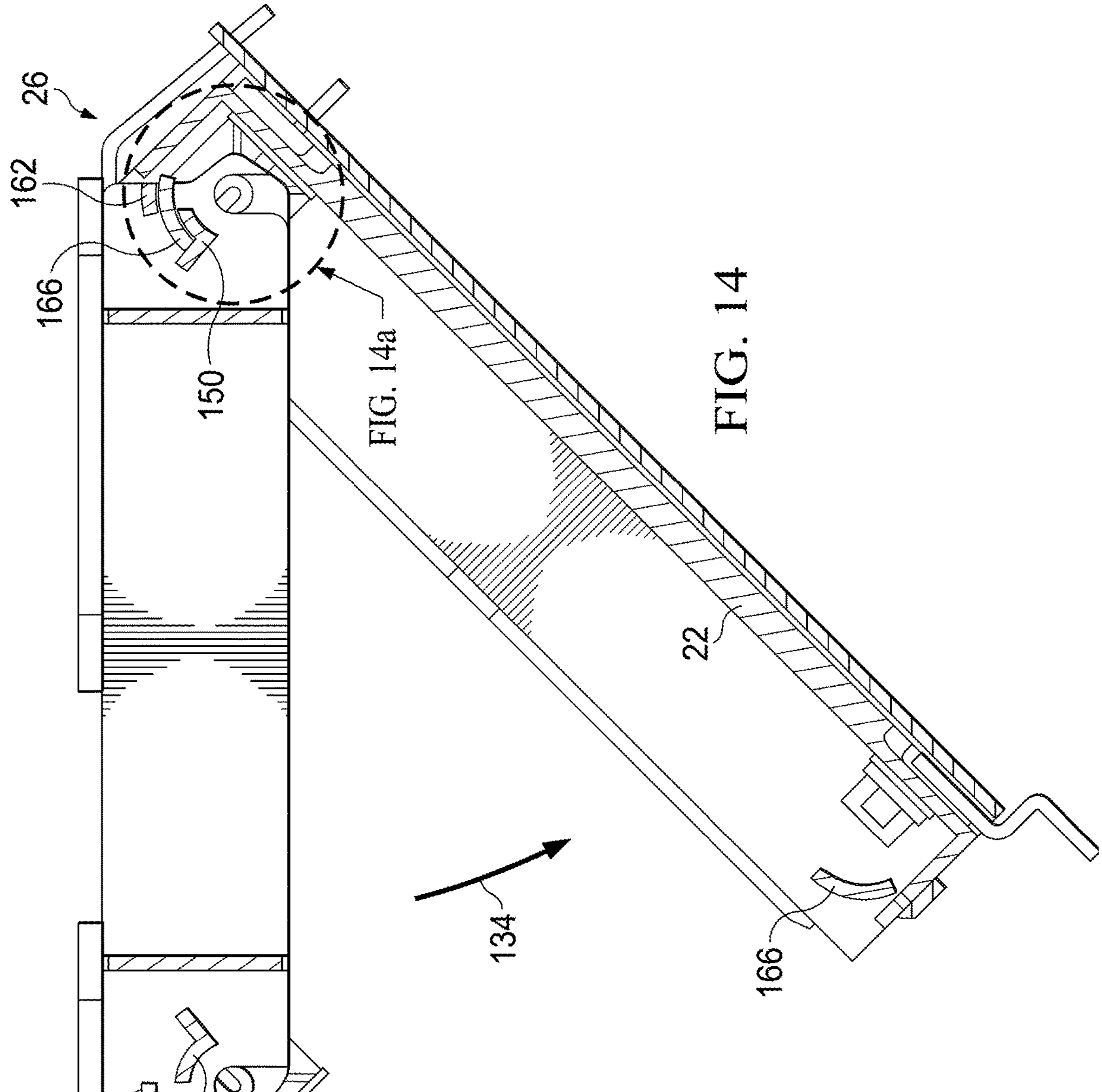
Figure 14A:
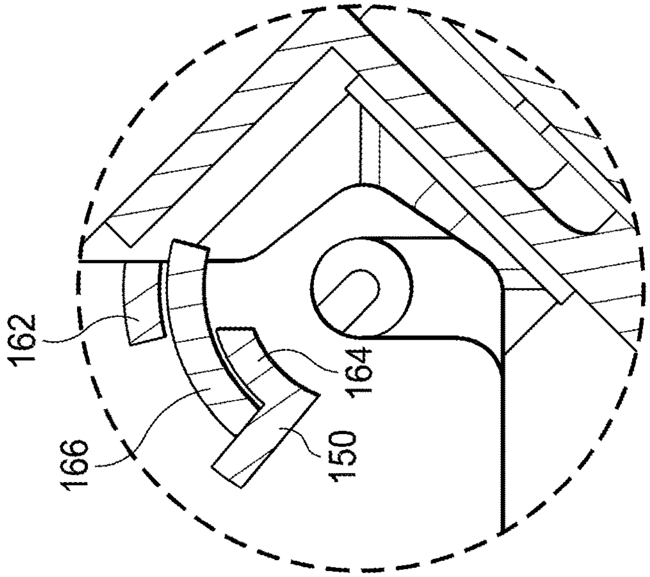
Figure 15:
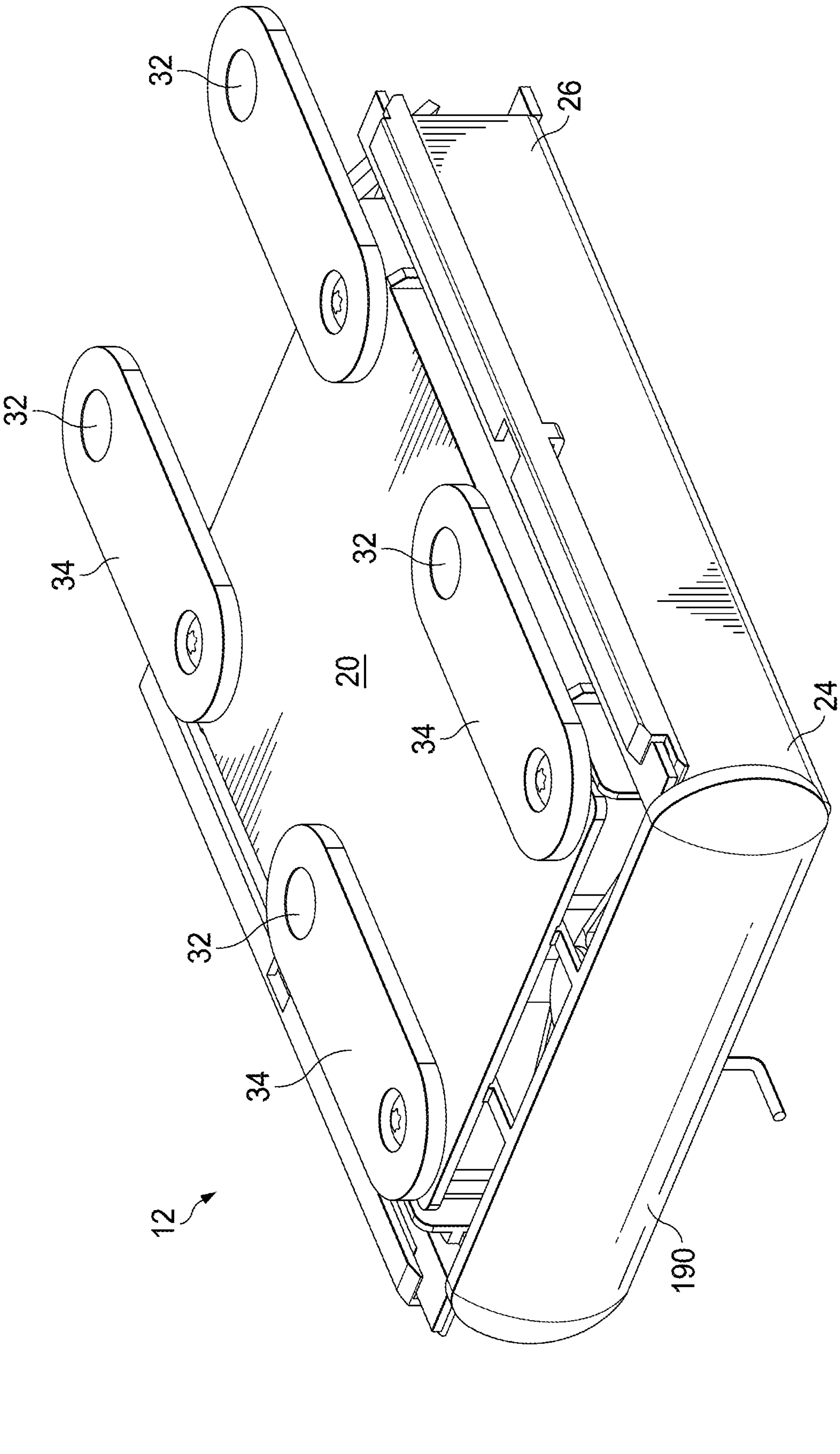

FIG. 15 is an illustration of the fire suppression system of FIGS. 1-14 having an end cover.

Figure 16:
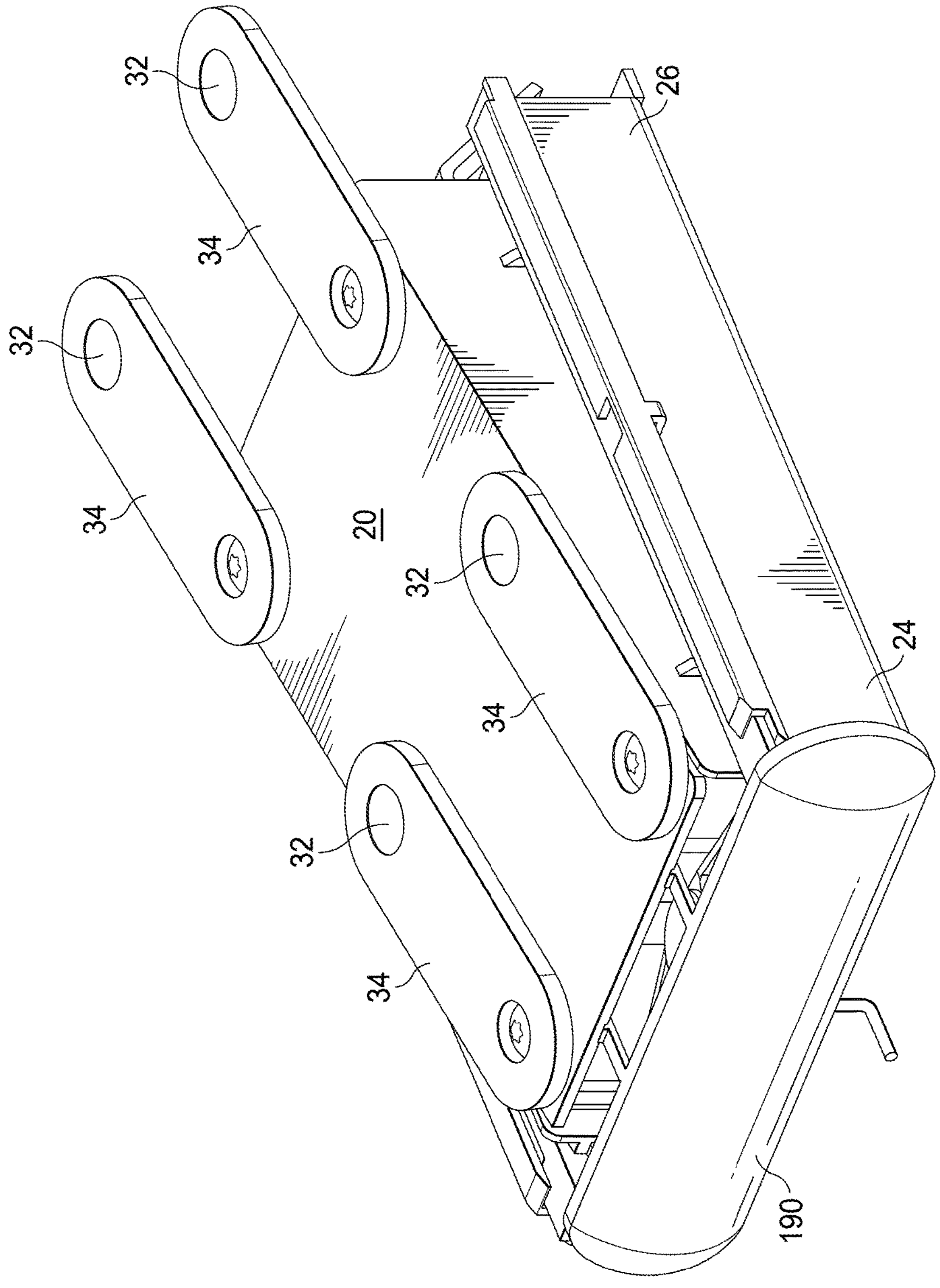

FIG. 16 is an illustration of another embodiment of a fire suppression system.

Figure 17:
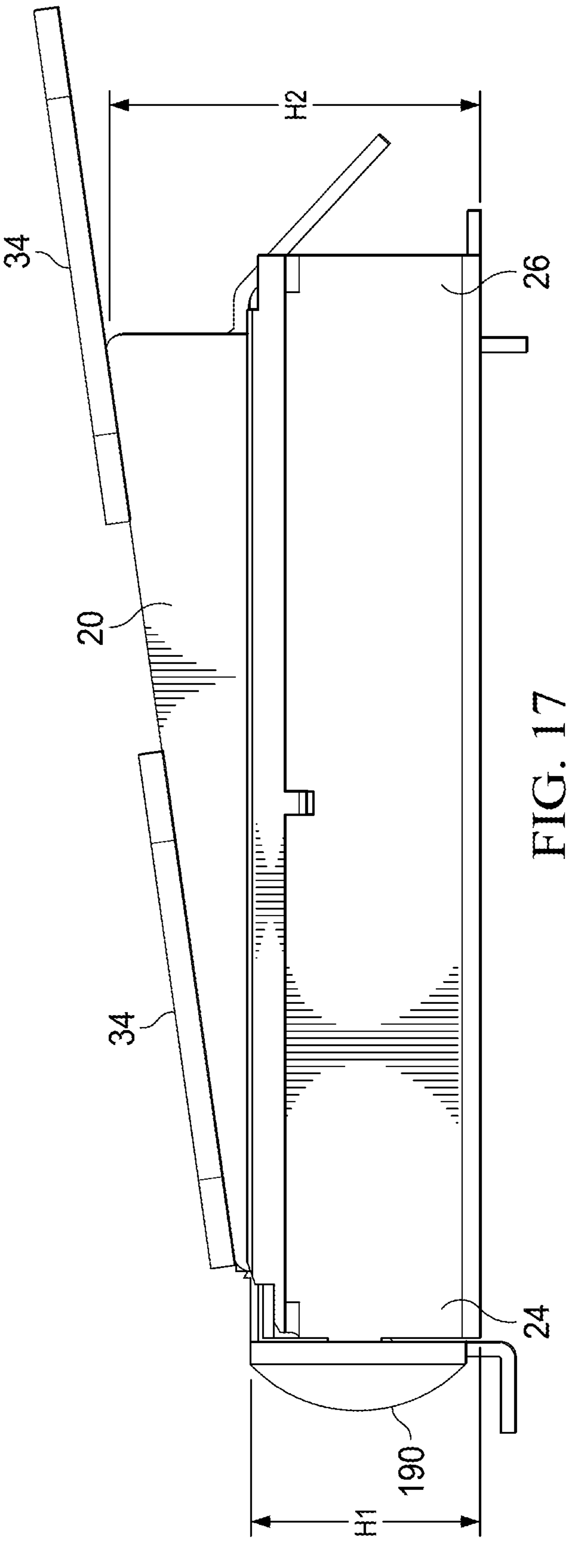

FIG. 17 illustrates a side view of the fire suppression system of FIG. 16.

Figure 18:
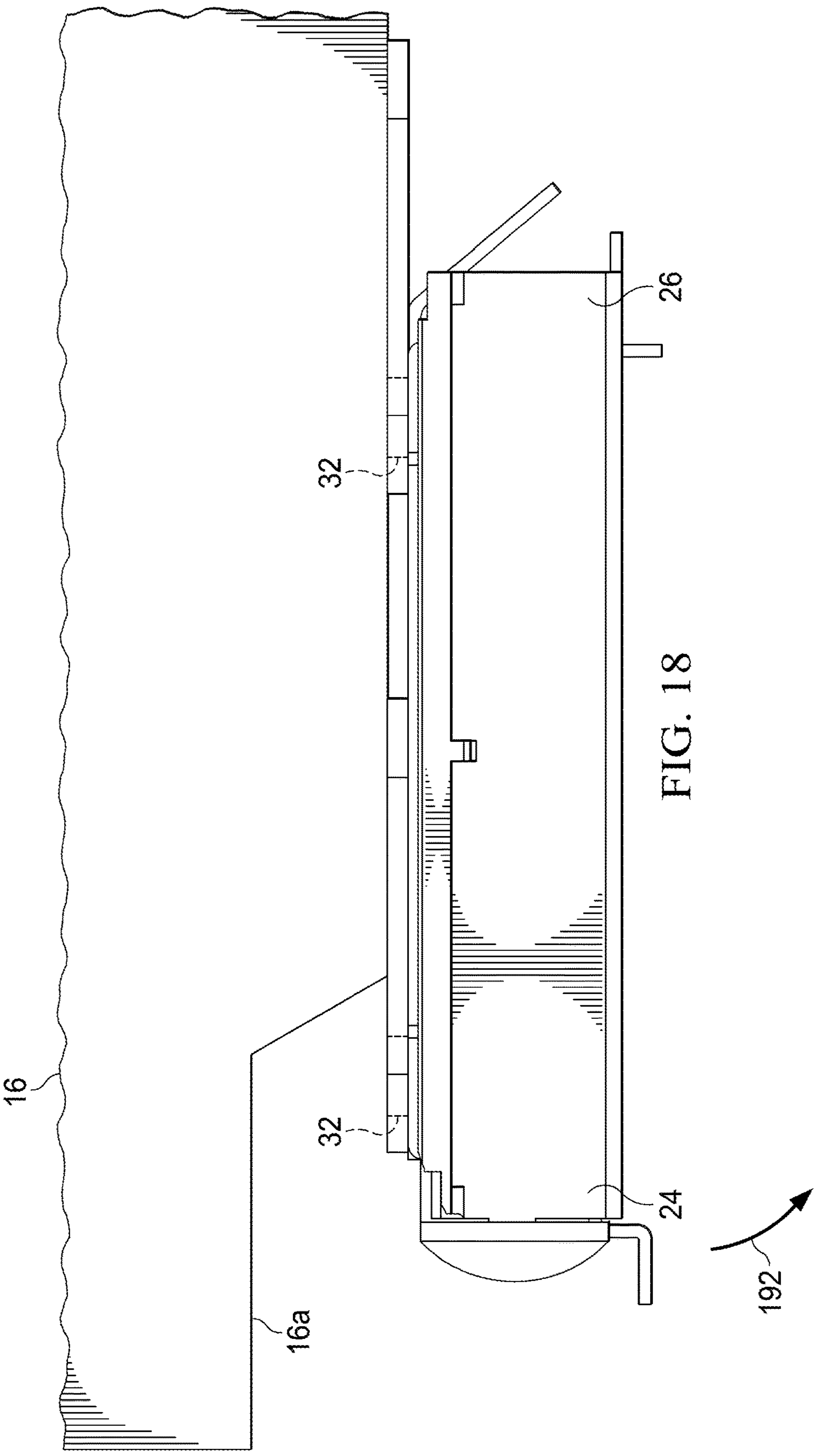

FIG. 18 illustrates a fire suppression system secured to the underside of a microwave.

Figure 19:
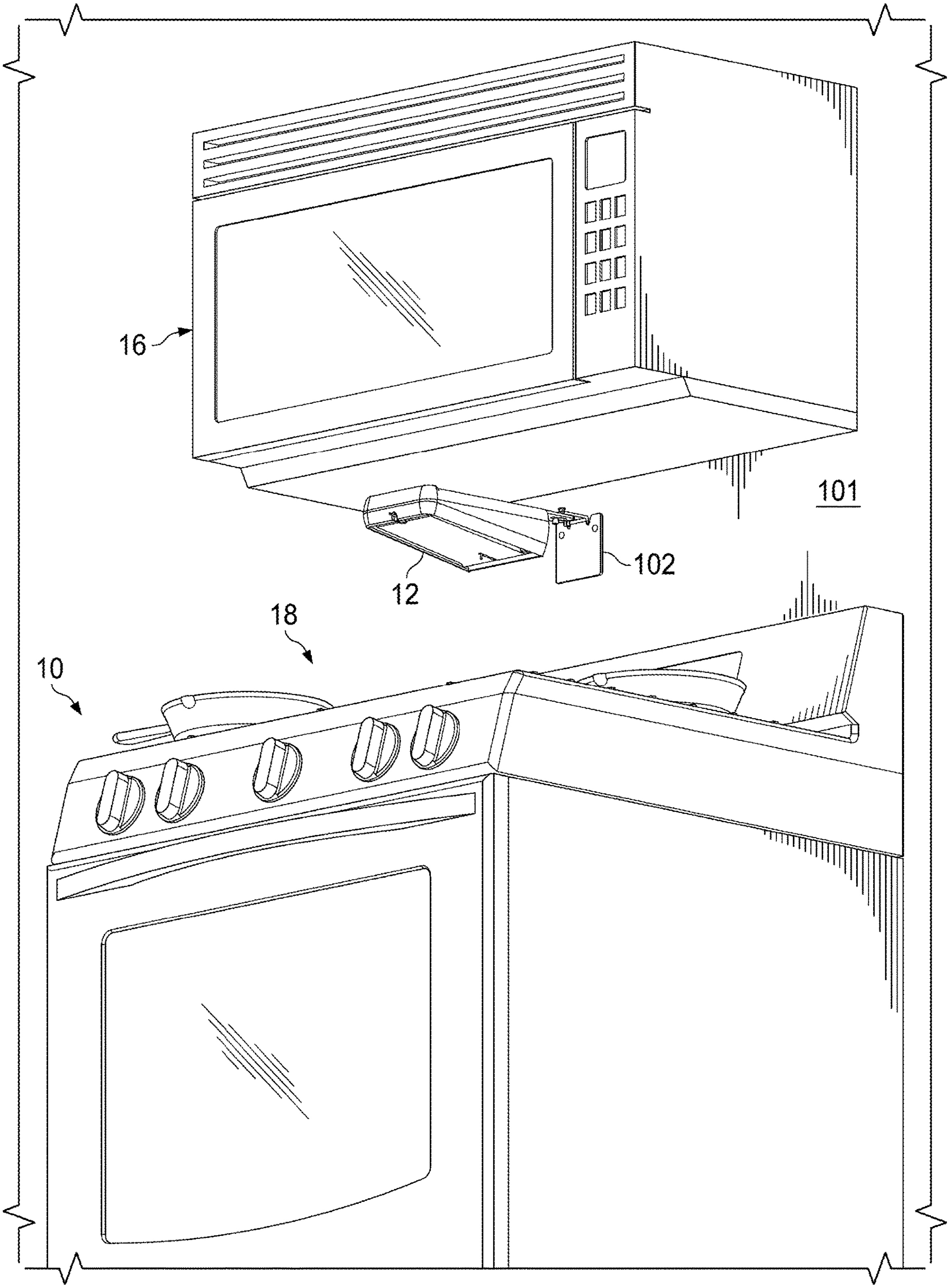
Figure 20:
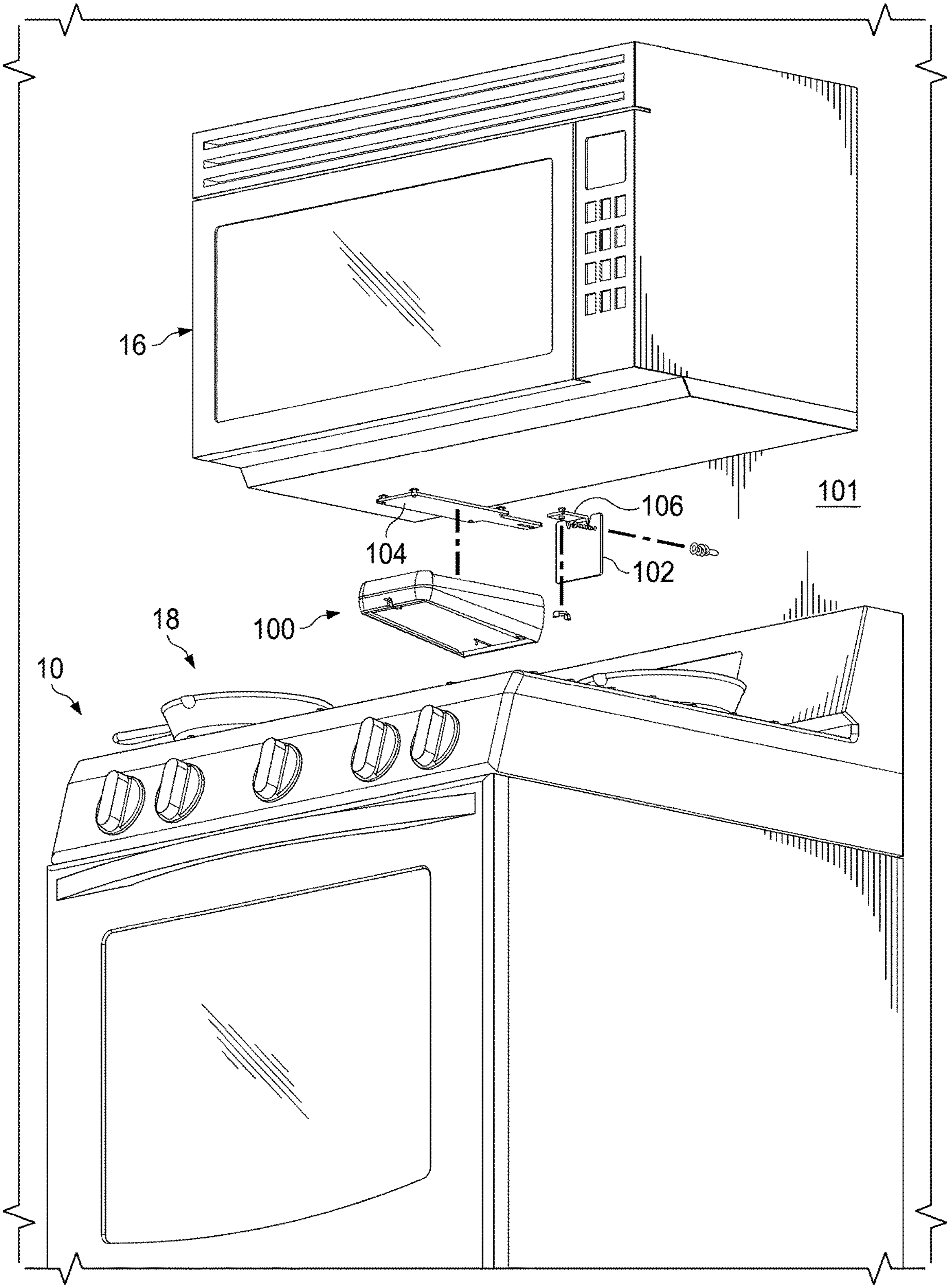

FIGS. 19 and 20 illustrate a fire suppression system secured to a wall via a wall support system.

Figure 21:
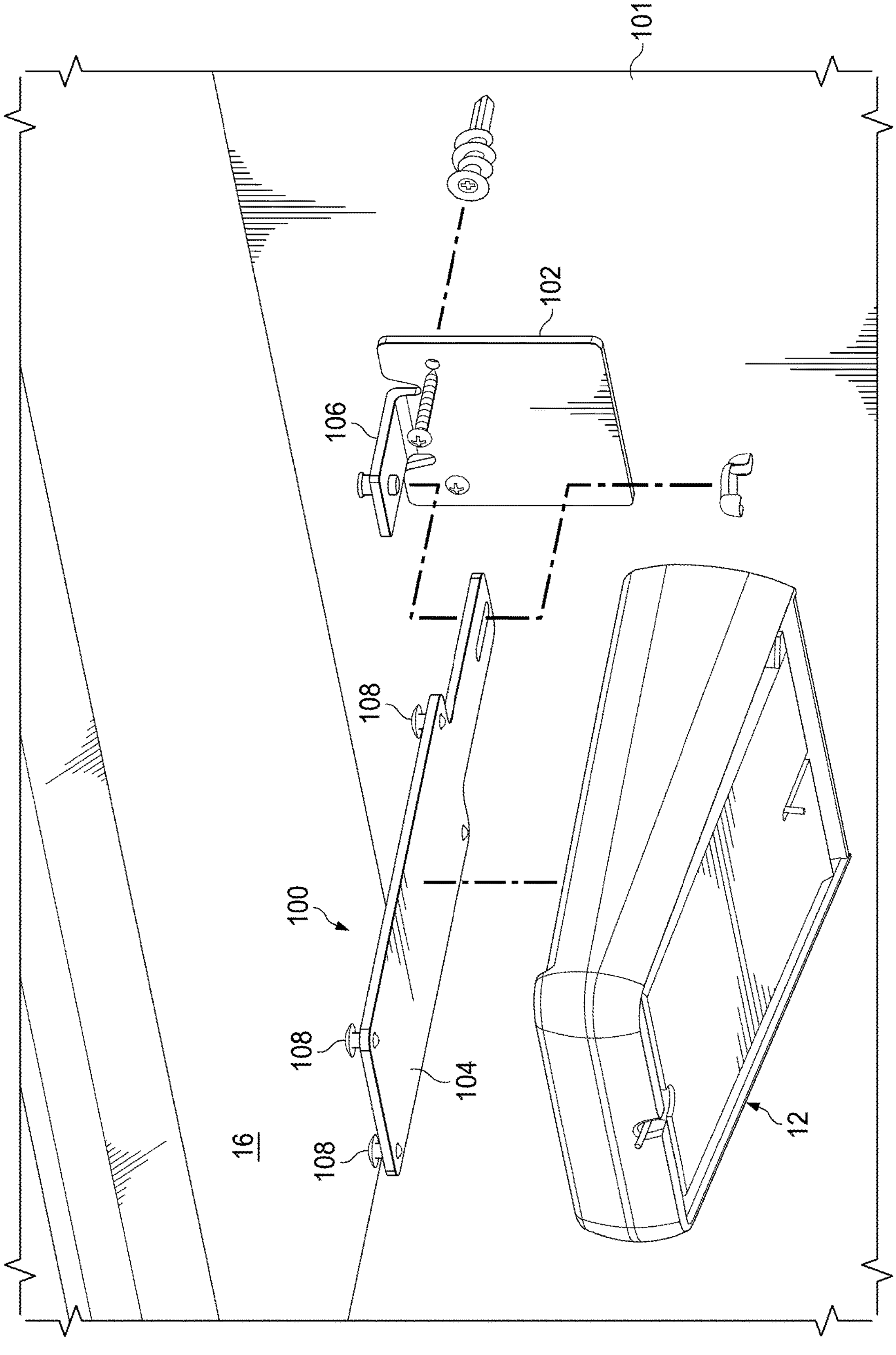

FIG. 21 illustrates a bottom perspective view of the fire suppression system and the wall support system of FIGS. 19 and 20.

Figure 22:
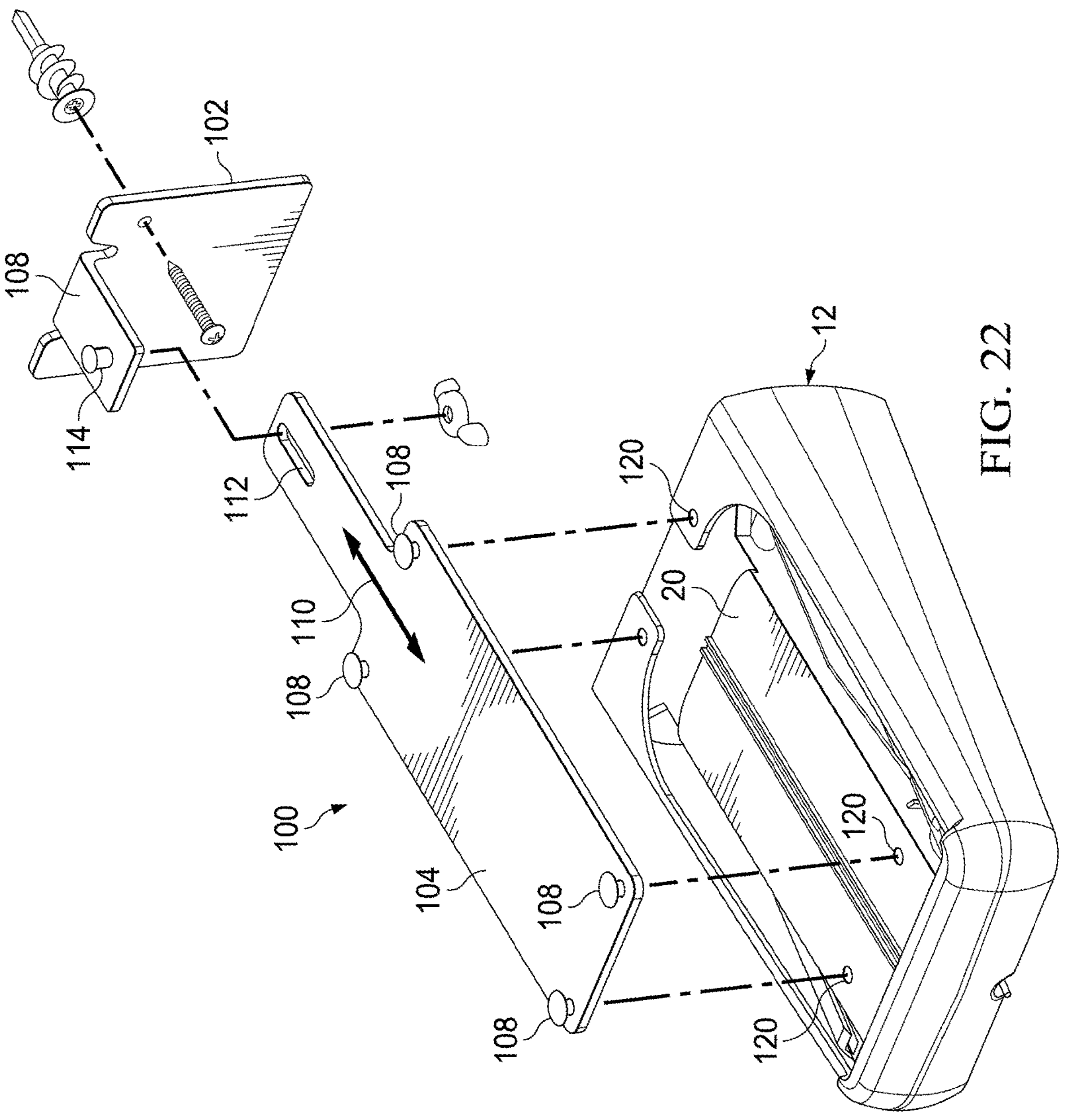

FIG. 22 illustrates top perspective view of the fire suppression system and the wall support system of FIGS. 19-21.

Figure 23:
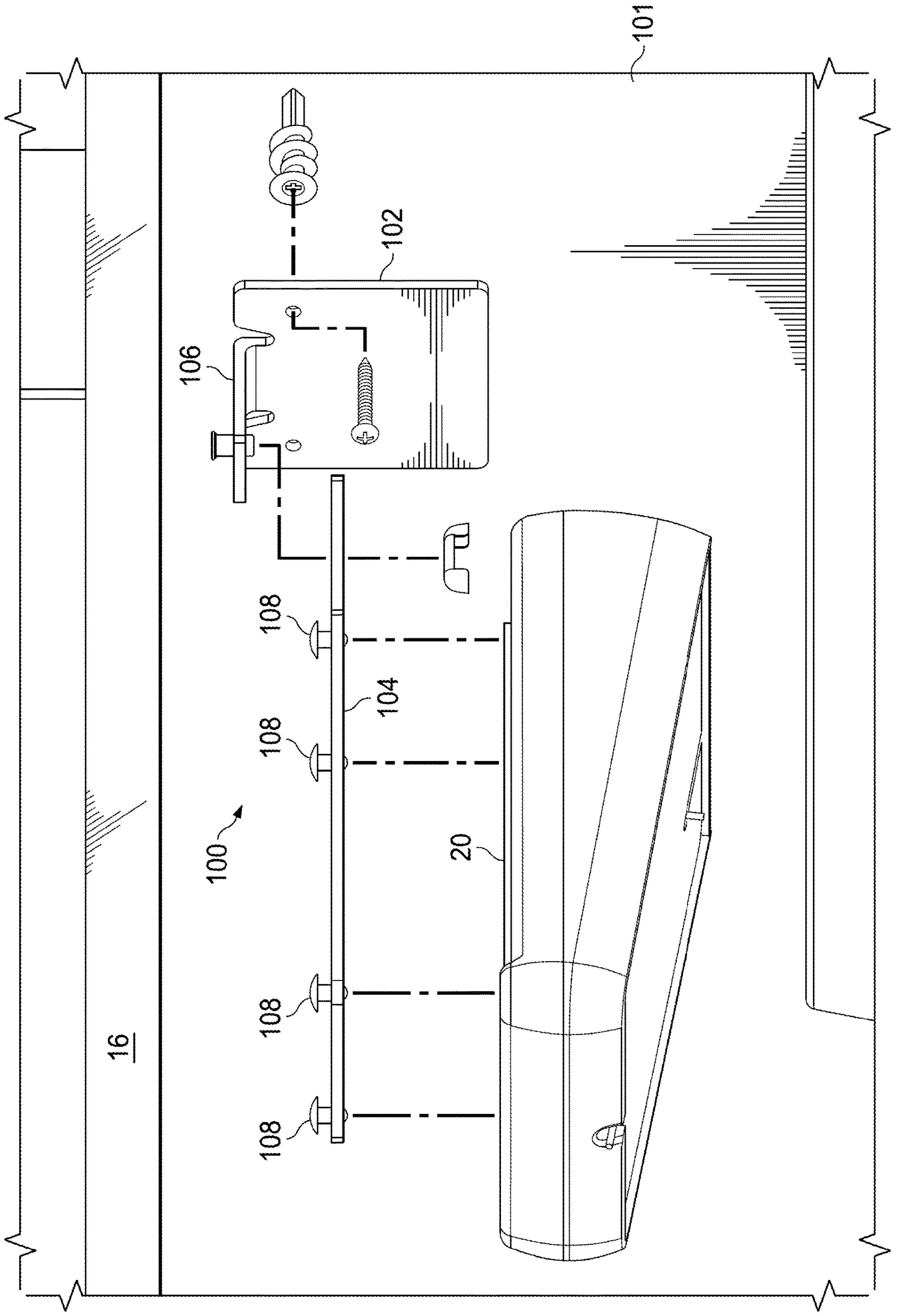

FIG. 23 illustrates an detailed exploded view of the fire suppression system and the wall support system of FIGS. 19-22.

DETAILED DESCRIPTION

Figure 1:
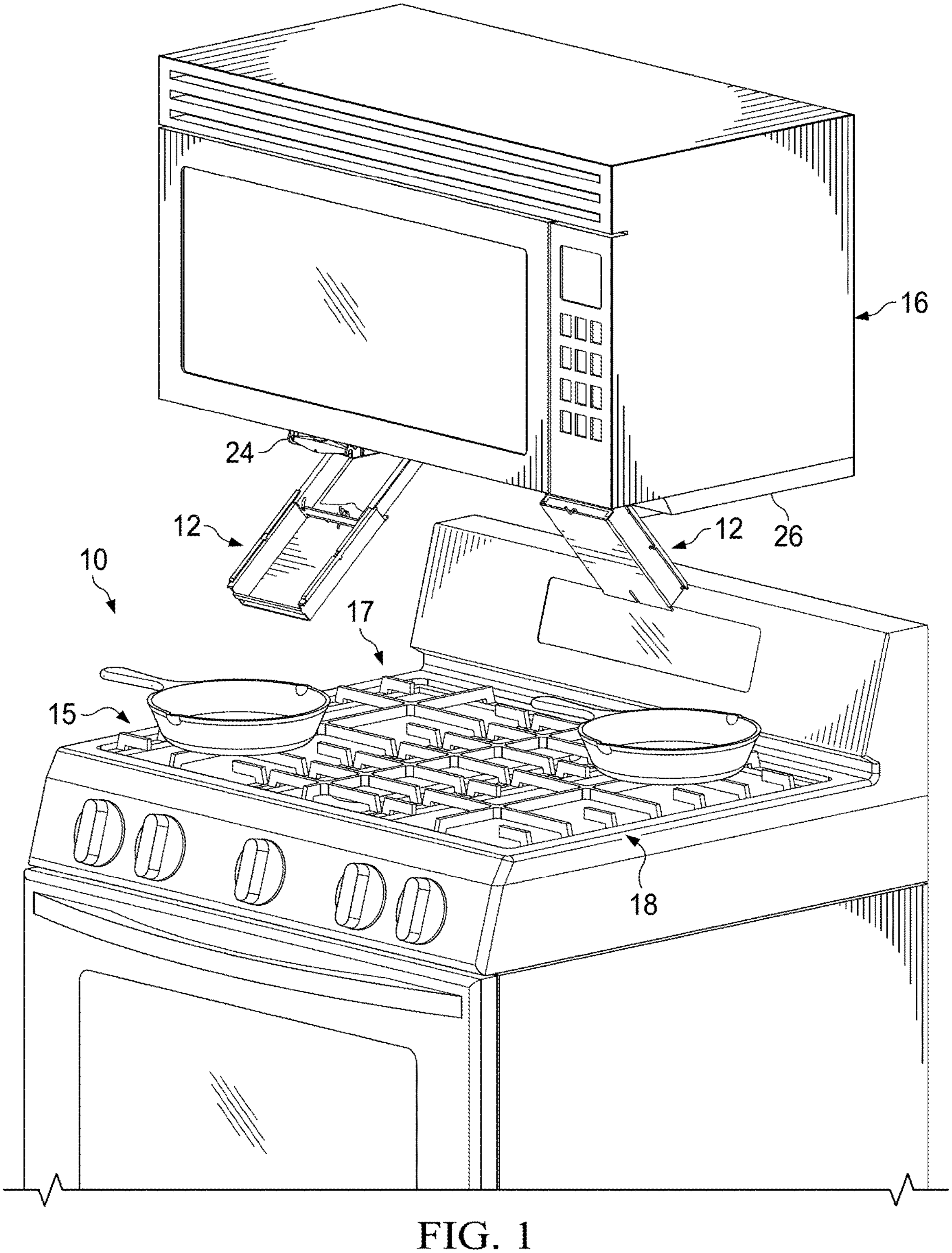
FIG. 1 is an illustration of a stovetop in which a stovetop fire suppression system is employed to advantage.

FIG. 1 is an illustration of a stovetop 10 in which a pair of fire suppression devices 12 are secured to the bottom side of an overhead support structure 16, such as, for example, a microwave or vent hood. As discussed in greater detail below, each fire suppression device 12 incorporates and/or otherwise employs a dual pivot/hinge system to enable each of the devices 12 to selectively open toward a front burner 15 or a rear burner 17 on a stovetop cooking surface 18 in response to detecting a fire on the front burner 15 or the rear burner 17.

Figure 2:
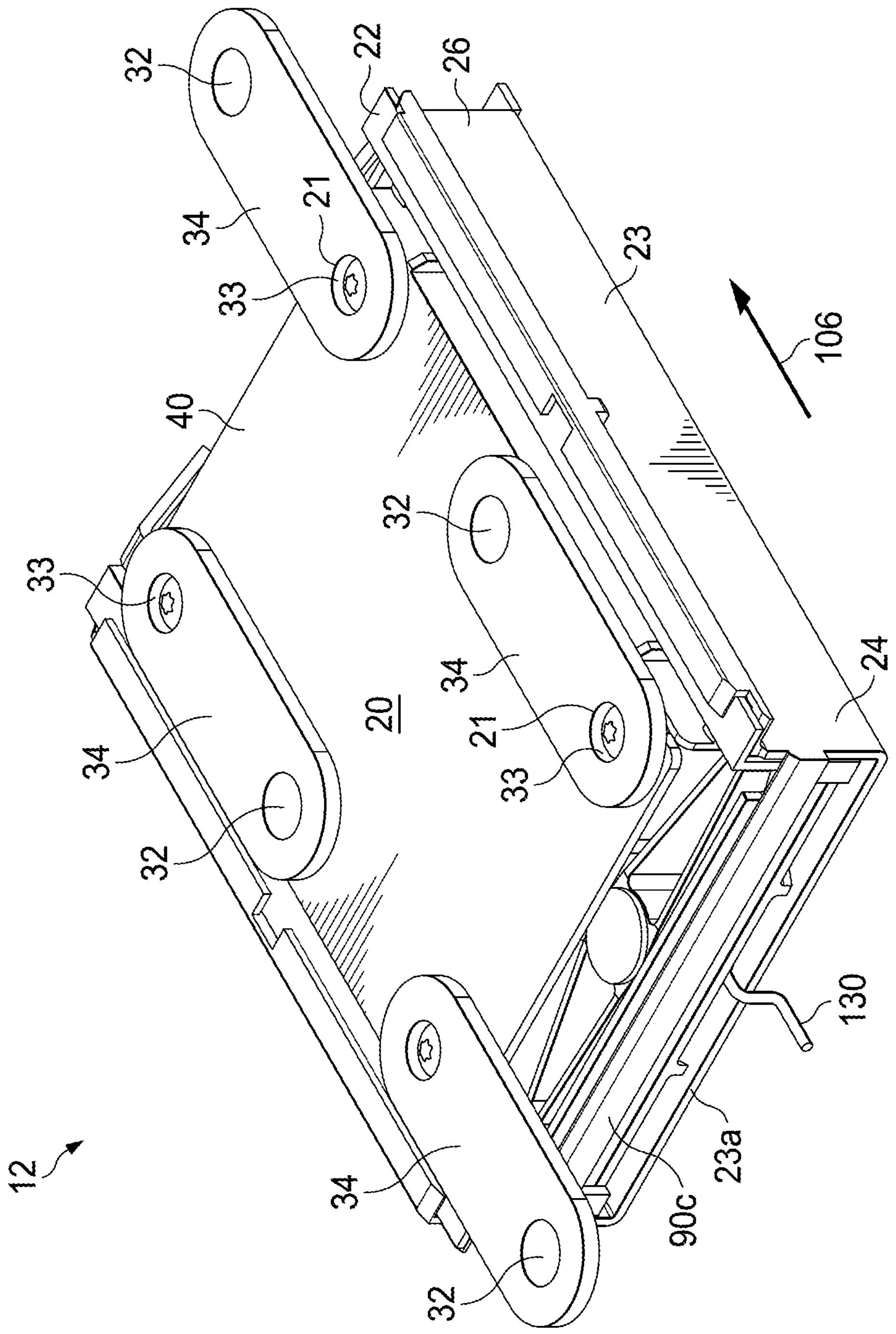
FIG. 2 is a front perspective view of the of stovetop fire suppression system FIG. 1 in a closed position.

Referring specifically to FIGS. 2 and 3, an exemplary embodiment of the fire suppression device 12 is configured in a storage position (FIG. 2) and in a dispensing position (FIG. 3). In FIGS. 2 and 3, the fire suppression device 12 includes a base member 20 and a chute member 22 rotatably secured to the base member 20 at first and second ends 24 and 26. In particular, the chute member 22 is rotatably secured to the base member 20 at the first end 24 so as to be movable between the storage position, whereby the fire suppressant powder 36 (FIG. 5) is stored within the suppression device 12, and the dispensing position, whereby the chute member 22 pivots downward toward the stovetop cooking surface 18 to dispense the fire suppression powder 36 onto the stovetop cooking surface 18.

According to embodiments disclosed herein, the fire suppression device 12 is releasably mounted to the underside of the overhead support structure 16 in a position such that (i) as the chute member 22 pivots about first end 24, the chute member 22 is aligned to dispense the fire suppression powder 36 directly onto the rear burner 17 and (ii) as the chute member 22 pivots about the second end 26, the chute member 22 is aligned to dispense the fire suppression powder 36 onto the front burner 15.

In the embodiment illustrated in FIGS. 1-4, the fire suppression device 12 is removably attached to the overhead support structure 16 via a plurality of magnets 32. The fire 3 suppression device 12 includes a plurality of rotatable arms 34, each arm supporting at least one magnet 32 to facilitate attachment to the overhead support structure 16. Referring specifically to FIG. 2-4, the rotatable arms 34 are secured to the base member 20 via screws 37, which allows the rotational movement of the arm 34 in order to appropriately position the magnets 32 for attachment to the underside of the overhead support structure 16. The rotational movement provides flexibility to avoid non-metallic obstructions, such as, for example, lights and filters, that are often found on the underside of microwave ovens and vent hoods. It should be understood that other methods of attachment may be uses, such as, for example, clips, in order to rotationally or non-rotationally secure the arms 34 to the base 20. The magnets 32 are strong enough to securely attach the fire suppression device 12 to the overhead support structure 16 without the need for additional or complicated mounting arrangements.

According to some embodiments, the clips can be integrally molded or otherwise a single unitary piece with the base member 20 so as to enable a secure connection between the rotatable arms 34 and the base member 20. According to some embodiments, the clips 37 comprise a plurality of spaced apart tabs that are sized to frictionally engage an inner wall of a corresponding opening 33 on the arm member 34. It should be understood, however, that any other type of method of securing the rotatable arms 34 to the base member 20 or any other portion of the fire suppression device 12 is permissible. Furthermore, while four rotatable arms 34 are illustrated, it should be understood that a greater or fewer number or rotatable arms 34 may be utilized and a greater number of magnets 32 may be secured to each rotatable arm 34. According to other embodiments, in addition to or in lieu of having rotatable arms 34, the arms can be designed with a slot to permit sliding movement of the arm 34 relative to the base member 20. Thus, for example, the arm 34 may have a slot sized to receive a corresponding pin extending from the base member 20, the pin engaging the slot to permit sliding movement of the arm 34 relative to the base member 20. Additionally, the arms 34, in addition to or in lieu of being rotatable, may be configured as adjustable in length to accommodate the obstructions commonly occurring on the underside of microwaves and vent hoods and other overhead support structures 16.

Referring specifically to FIGS. 3 and 4, the chute member 22 is formed having a bottom wall 50, a pair of sidewalls 50*a* and 50*b* and a metering bar 51 extending between the sidewalls 50*a* and 50*b*. According to some embodiments, the chute member 22 further includes an extension member 23 extendable from the chute member 22 such that an end 23*a* of the extension member 23 is positioned to direct fire suppression powder 36 onto the front burner 15. In the embodiment illustrated in FIGS. 3 and 4, the extension member 23 telescopingly extends from the chute member 22. Similar to the chute member 22, the extension member 23 is formed having a bottom wall 90 and a pair of sidewalls 90*a* and 90*b* forming an extended ramp or pathway from the chute member 22 to the end 23*a* of the extension member 23. According to some embodiments, the extension member 23 includes a cross support member 90*c* extending between the sidewalls 90*a* and 90*b*. Cross support member 90*c* provides additional rigidity to the extension member 23.

Figure 4B:
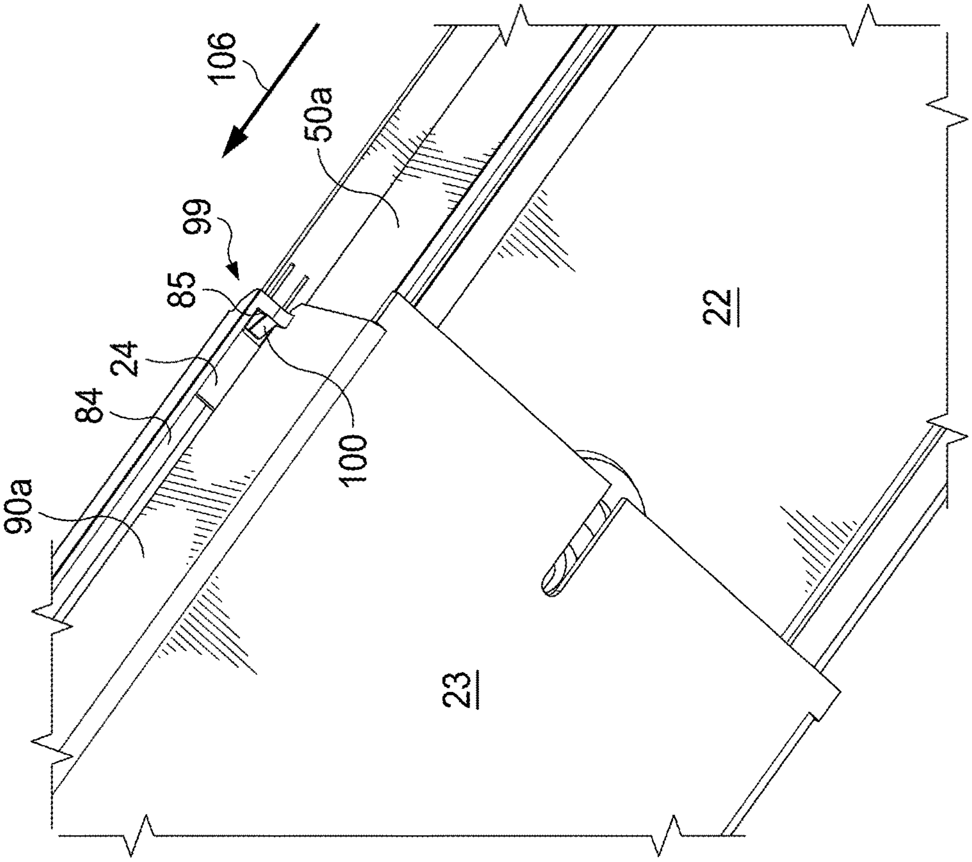
Figure 4A:
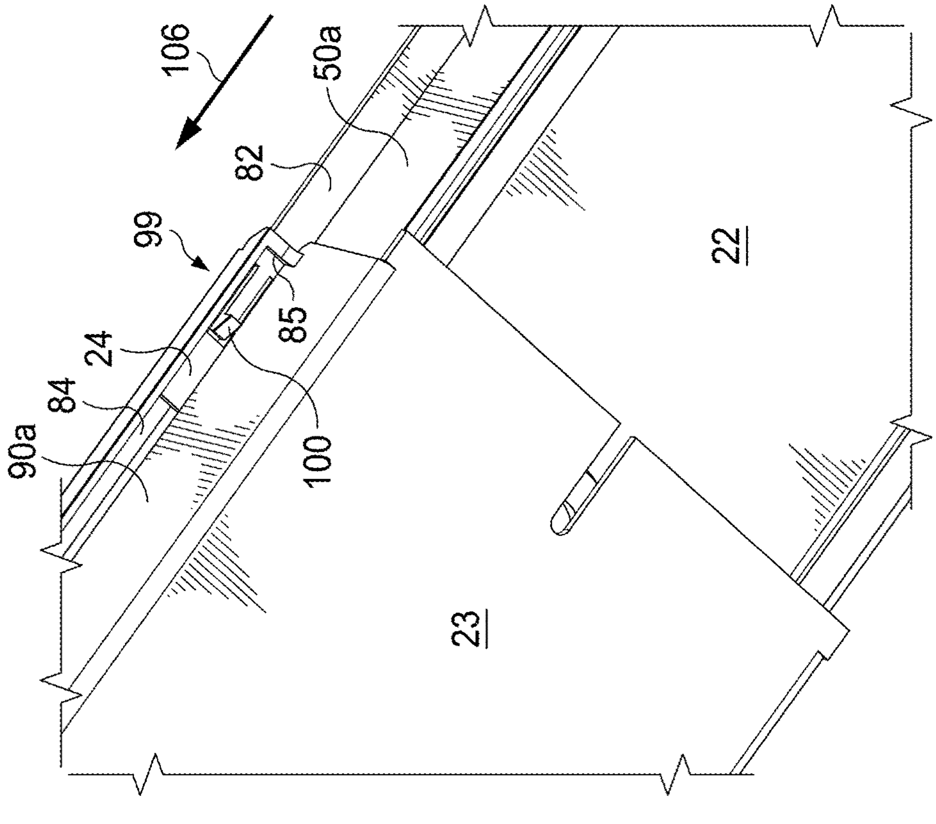

In operation, as the chute member 22 transitions from the stored position downward toward the stovetop cooking surface 18 to the dispensing position, the extension member 23 telescopingly extends to an extended position, as seen for example, in FIG. 4. Referring to FIGS. 3 and 4, the extension member 23 moves relative to the chute member 22 along tracks 80. Each track 80 is formed having a tongue 82 slideably disposed inside a groove 84. In the embodiment illustrated in FIG. 4, a tongue 82 extends outward from the sidewall 50*a* and 50*b*. The extension member 23 includes the groove 84 disposed along the sidewalls 90*a* and 90*b* sized to receive the respective tongue 82 therein. As seen specifically in FIGS. 4*a* and 4*b*, the groove 84 of the chute member 22 includes a stop system 99 formed as tab member 100 disposed at the first end 24, the tab member 100 configured to contact and otherwise engage a corresponding end wall 85 of the groove 84 on the extension member 23 so as to prevent overextension of the extension member 23 in the direction of arrow 106. In the embodiment illustrated in FIGS. 4*a* and 4*b*, the chute member 22 includes a tab member 100 on each tongue 82 extending from sidewalls 50*a* and 50*b*; however, it should be understood that only a single tab member 100 on either sidewall 50*a* or 50*b* may be utilized. Furthermore, it should be understood the stop system 99 may consist of any other configuration designed or otherwise utilized to resist the unwanted movement of the extension member 23 when the fire suppression device 12 actuates to extinguish a fire on a rear burner 17.

It should be understood that other methods of extension may be used. For example, the extension member 23 may be pivotably attached to the chute member 22.

Referring to FIGS. 3, 5 and 6, the fire suppression powder 36 is illustrated stored within a storage area 28 that is sized to store a sufficient volume of fire suppression powder 36 to suppress at least one stovetop fire. As illustrated, the base member 20 and the chute member 22, when the fire suppression device is in the closed position, form the storage area 28 for holding the fire suppression powder 36 therein. In particular, the base member 20 includes a top wall 40 (removed from FIG. 5, but illustrated in FIGS. 2-4), a pair of sidewalls 42 and 44, a front wall 46 and a rear wall 48 extending from the top wall 40 so as to contact and otherwise engage the bottom wall 50 (best illustrated in FIG. 3) of the chute member 22. With particular reference to FIG. 3, the chute bottom wall 50 includes a channel 52 to receive a seal 54 (see FIG. 8). The channel 52, and thus the seal 54, correspond to the shape of the walls 42, 44, 46 and 48 of the base member 20 such that when the fire suppression device 12 is in the closed position, the walls 42, 44, 46 and 48 sealingly engage the seal 54 in order to contain the fire suppression powder 36 inside the storage area 28.

Referring now to FIGS. 5-7, a pair of hinges 60 and 62 are disposed at respective first and second ends 24 and 26 to not only enable movement of the chute member 22 between the stored and discharge positions, but also, as explained in greater detail below, to facilitate the direction of discharge. In FIG. 6, hinges 60 and 62 extend between sidewalls 42 and 44 of the base member 20. In some embodiments, each end of the hinge 60 and 62 includes a boss 110 supported within an opening 112 on each sidewall 42 and 44 to enable the rotational movement of the chute member 22. For example, hinges 60 and 62 are positioned at respective first and second ends 24 and 26 such that in response to an actuation device 120*a* detecting a fire on the front burner 15, the chute rotates about hinge 62 to direct fire suppression powder 36 on the front burner 15. Likewise, in response an actuation device 120*b* detecting a fire on the rear burner 17, the chute rotates about hinge 60 to direct fire suppression powder 36 onto the rear burner 17.

Referring now to FIGS. 5-8, the hinges 60 and 62 support respective actuation devices 120*a* and 120*b*. Each hinge 60 and 62 retains and otherwise supports the actuation device 120*a* and 120*b*, which secures the chute member 22 to the base member 20 in the closed position. In operation, actuation devices 120*a* and 120*b* are used to not only detect a fire condition, but when such condition is detected, the actuation devices 120*a* and 120*b* position the fire suppression device 12 from the closed position to the discharge position by causing the separation of, as explained in greater detail below, the chute member 22 from the base member 20.

In the embodiment illustrated in FIGS. 5-8, each actuation device 120*a* and 120*b* is formed having a charge cup 122 secured to each hinge 60 and 62 within an actuator support opening 124 (best illustrated in FIG. 6) and a corresponding charge cap 126 is attached to the each end of the chute member 22 on the bottom wall 50. The charge cap 126 is designed to be releasably secured to the charge cup 122 to facilitate separation therebetween. According to embodiments disclosed herein, the charge cap 126 threadingly engages the charge cup 122 in order to secure the chute member 22 to the base member 20. It should be understood, however, that other means of securing the charge cap 126 to the charge cup 122 can be used. For example, the charge cap 126 can be frictionally secured to the charge cup 122, an adhesive can be used to secure the charge cap 126 to the charge cup 122, any other method that allows releasable attachment between the parts.

Figure 8:
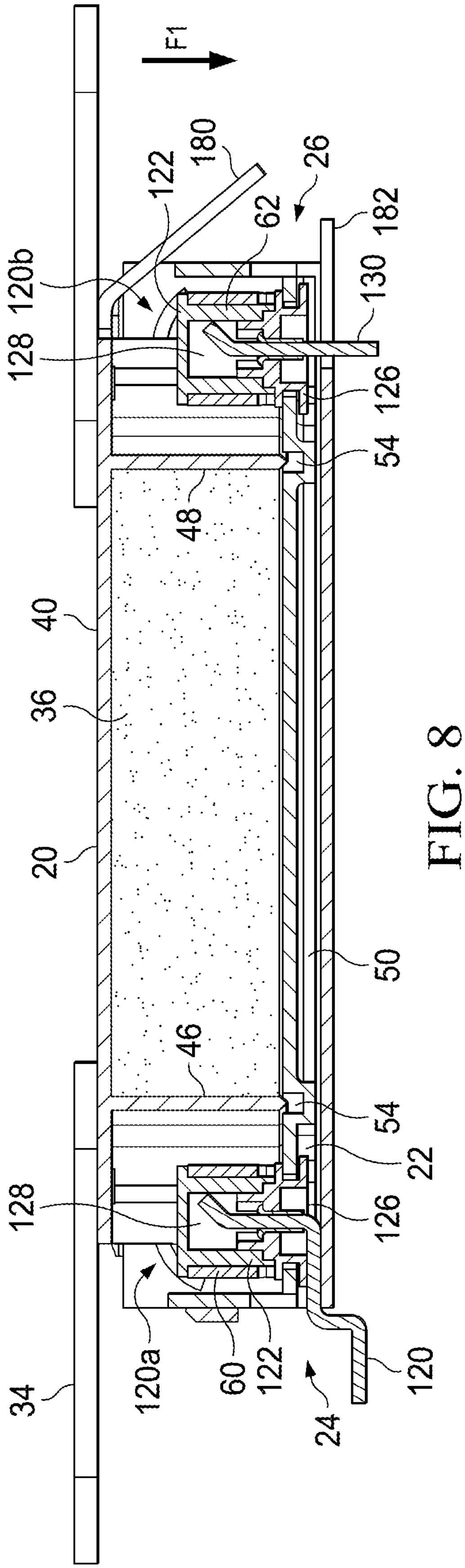

As illustrated in FIGS. 7 and 8, the charge cap 126 and the charge cup 122 form an interior cavity 128 for storing gun powder therein (not illustrated). A fuse 130 extends from the interior cavity 128 outside to the surrounding area such that when the fire suppression device 12 is disposed over the stovetop cooking surface 18. If a fire were to occur, the fuse 130 would burn, ultimately igniting the gun powder in the interior cavity 128, causing the chute member 22 to separate from the base member 20.

Figure 9:
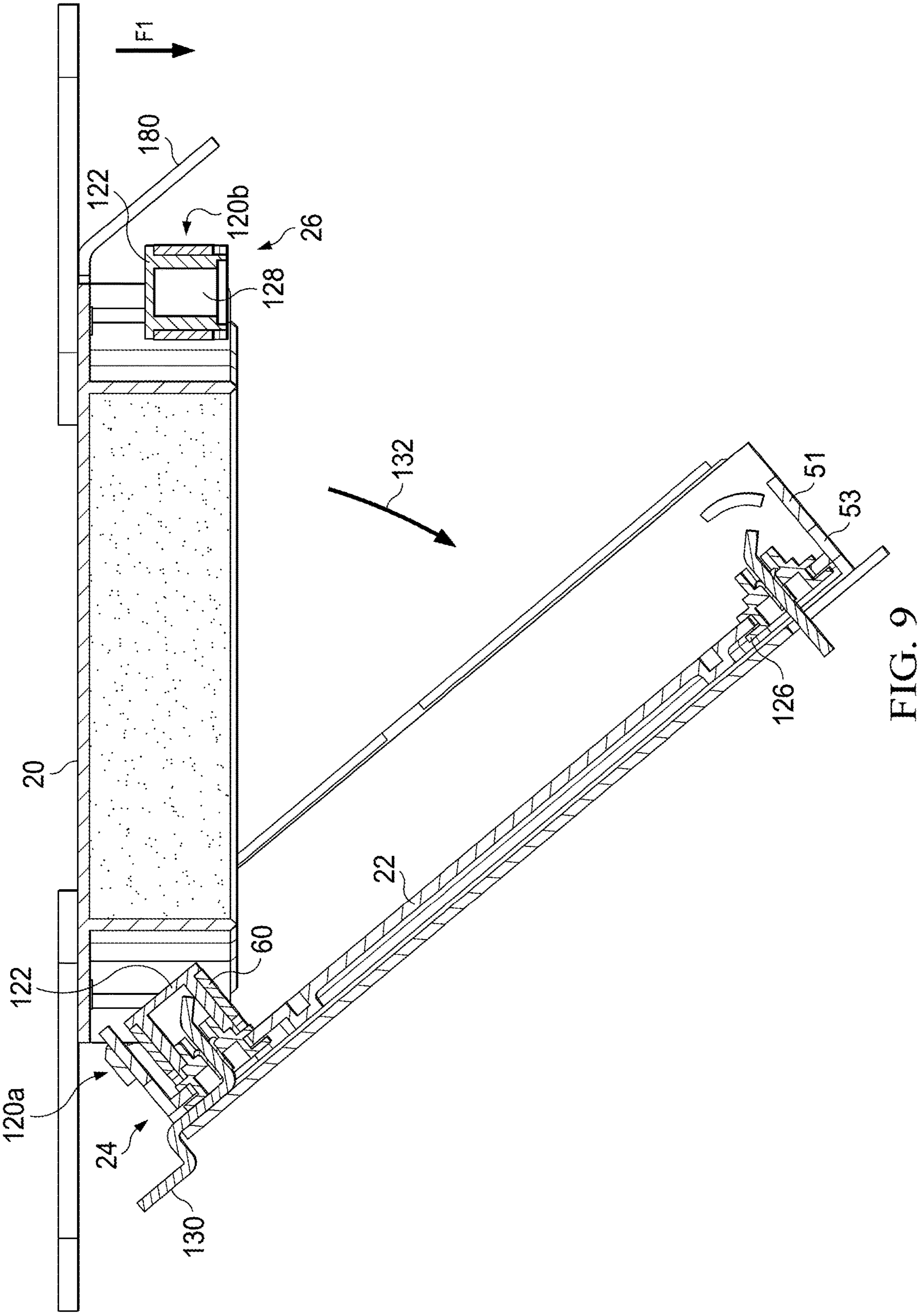

Referring now to FIGS. 8 and 9, when a fire occurs on the rear burner 17 (FIG. 1), the flames light the fuse 130 over the rear burner 17, which ignites the gunpowder disposed in the interior cavity 128. The ignition of the gun powder creates a separation force F1 resulting in separation of the chute member 22 from the base member 20 at the second end 26 causing rotation of the chute member 22 about the hinge 60 in the direction of arrow 132. The front actuation device 120*a* remains intact and is retained and otherwise supported by the hinge 60 allowing the chute member 22 to rotate in the direction of arrow 132. As the chute member 22 is rotated, the fire suppression powder 36 is released and gravitally flows from the storage area 28 and guided toward the fire, and in particular, the rear burner 17, by the chute member 22. Flow is restricted by an opening 53 formed by the metering bar 51, which causes the fire suppression powder 36 to fall onto the fire at a controlled rate.

Figure 10:
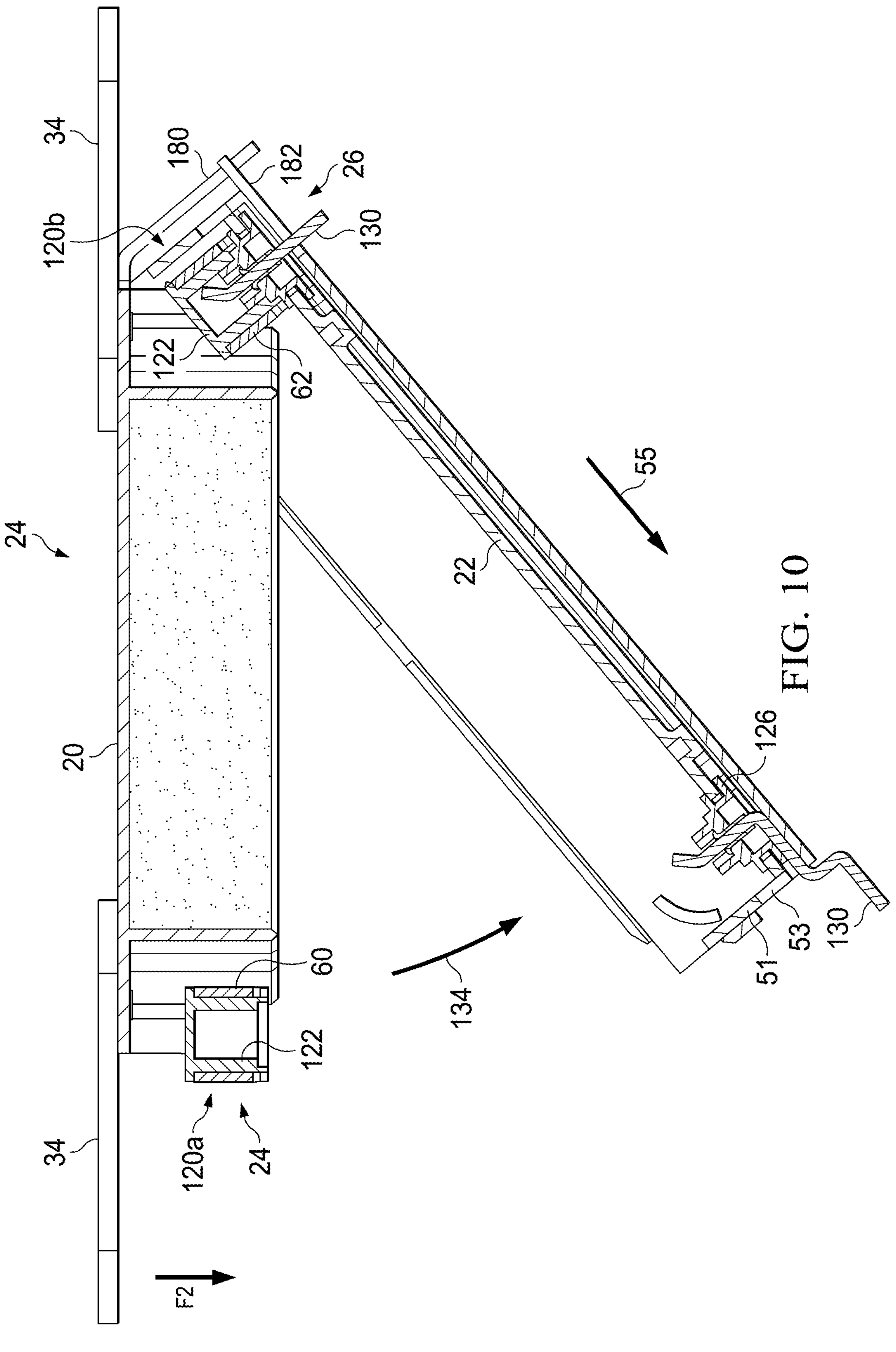
Figure 11:
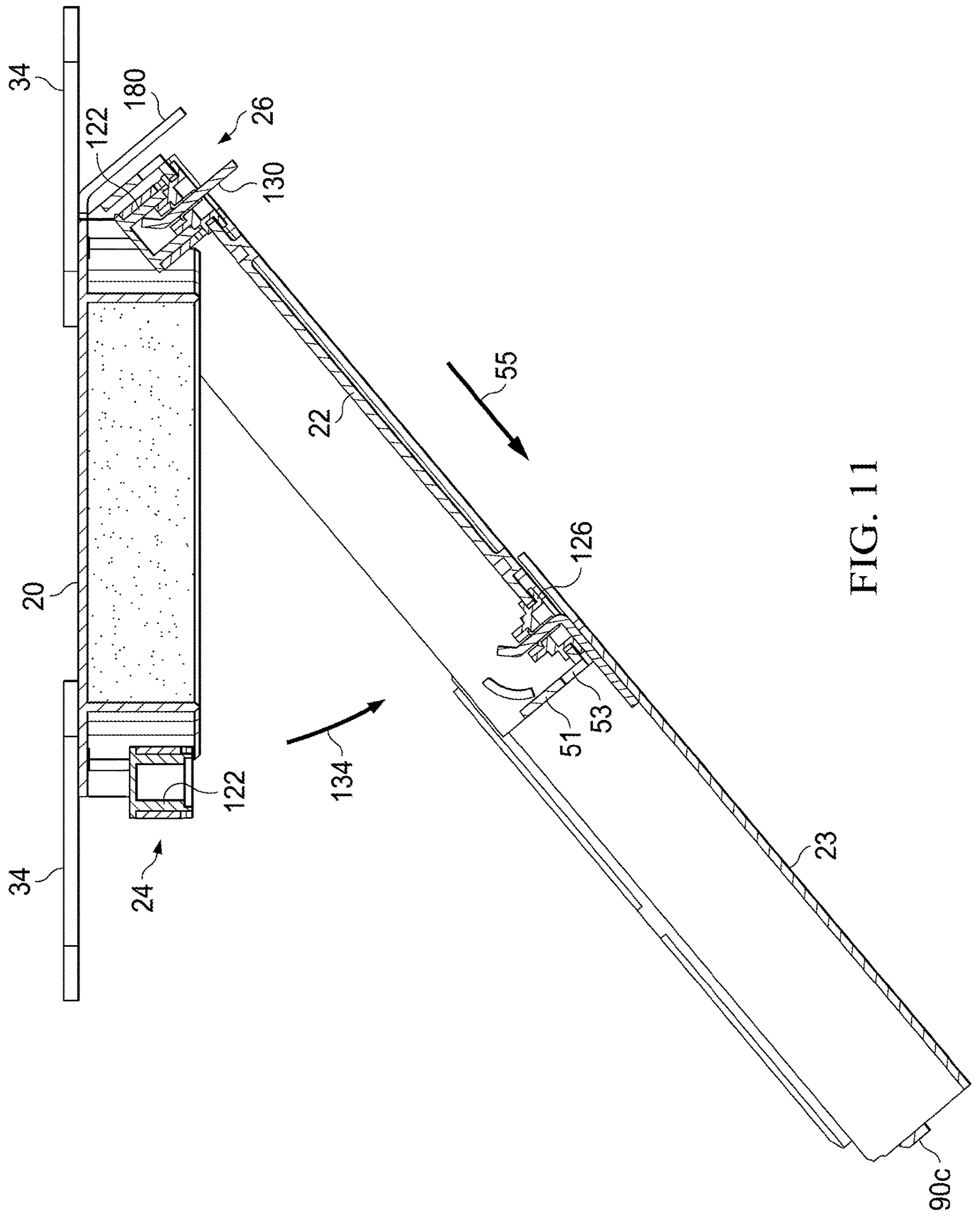

Likewise, when a fire occurs on the front burner 15, flames light the fuse 130 on the first end 24, which ignites the gunpowder in the interior cavity 128. As illustrated in FIGS. 10 and 11, the ignition of the gun powder creates a separation force F2 resulting in separation of the chute member 22 from the base member 20 at the first end 24, causing rotation of the chute member 22 about the rear hinge 62 in the direction of arrow 134. As the chute member 22 is rotated away from the base member 20, the extension member 23 extends outward in the direction of arrow 55 so as to direct the fire suppression powder 36 over the front burner 15.

A chute push bar 180 extends from the base member 20 and is sized to contact a chute extension 182 that extends from the chute member 22. In operation, when the actuation member 120*a* actuates causing the chute member 22 to rotate in the direction of arrow 134, the extension 23 extends outward in response to the chute extension 182 contacting the chute push bar 180. In other embodiments. However, other methods of extension may be used. For example, in other embodiments, a biasing member (not illustrated), such as a spring, may be utilized to exert a force on the extension member 23 to force it in the direction of arrow 55 to the extended position. Thus, in response to the detection of a fire, as the chute member 22 transitions to the dispensing position, the stored energy in the biasing member exerts a force on the extension member 23 to position the extension member 23 in the extended position. In addition or in lieu of the foregoing, the chute member 23 is operable move to the extended position via gravity acting on the chute member 23.

Figure 12:
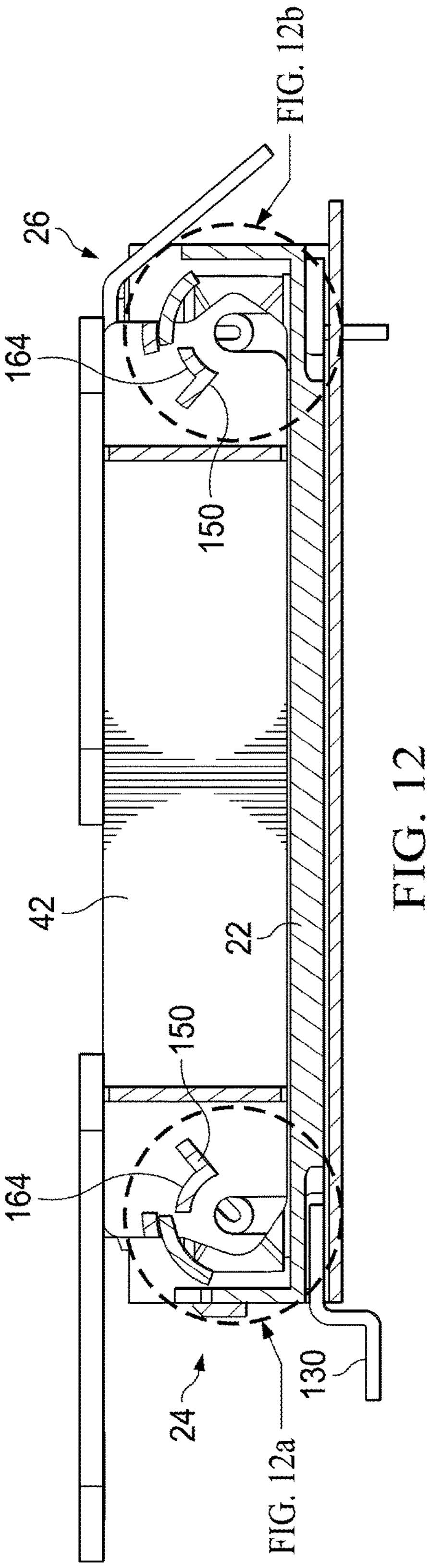
Figure 12B:
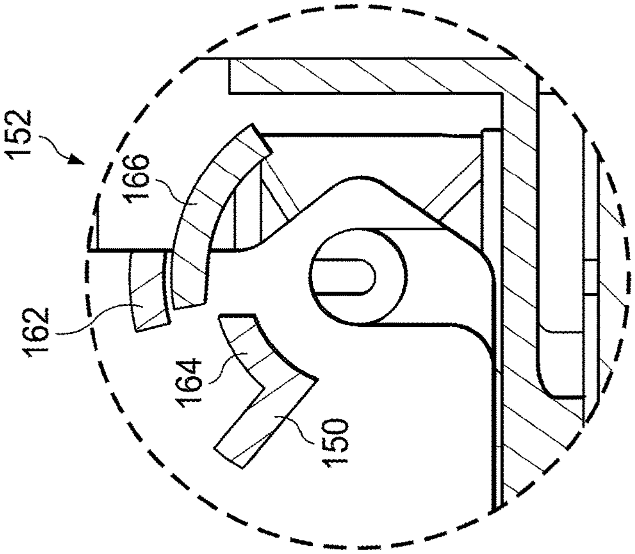
Figure 12A:
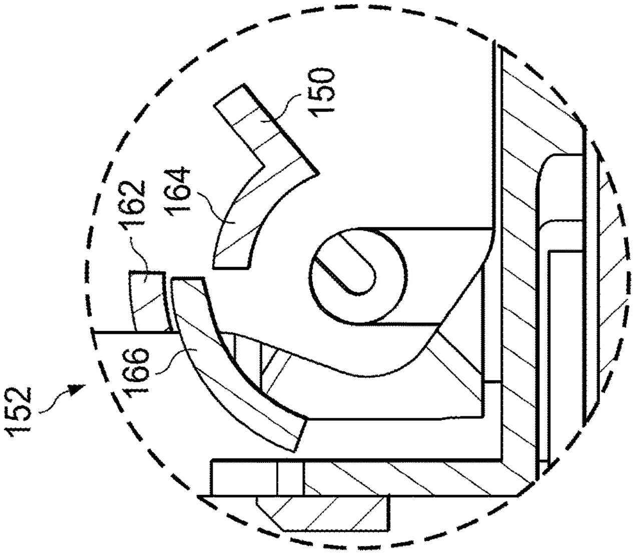
Figures 13, 13A:
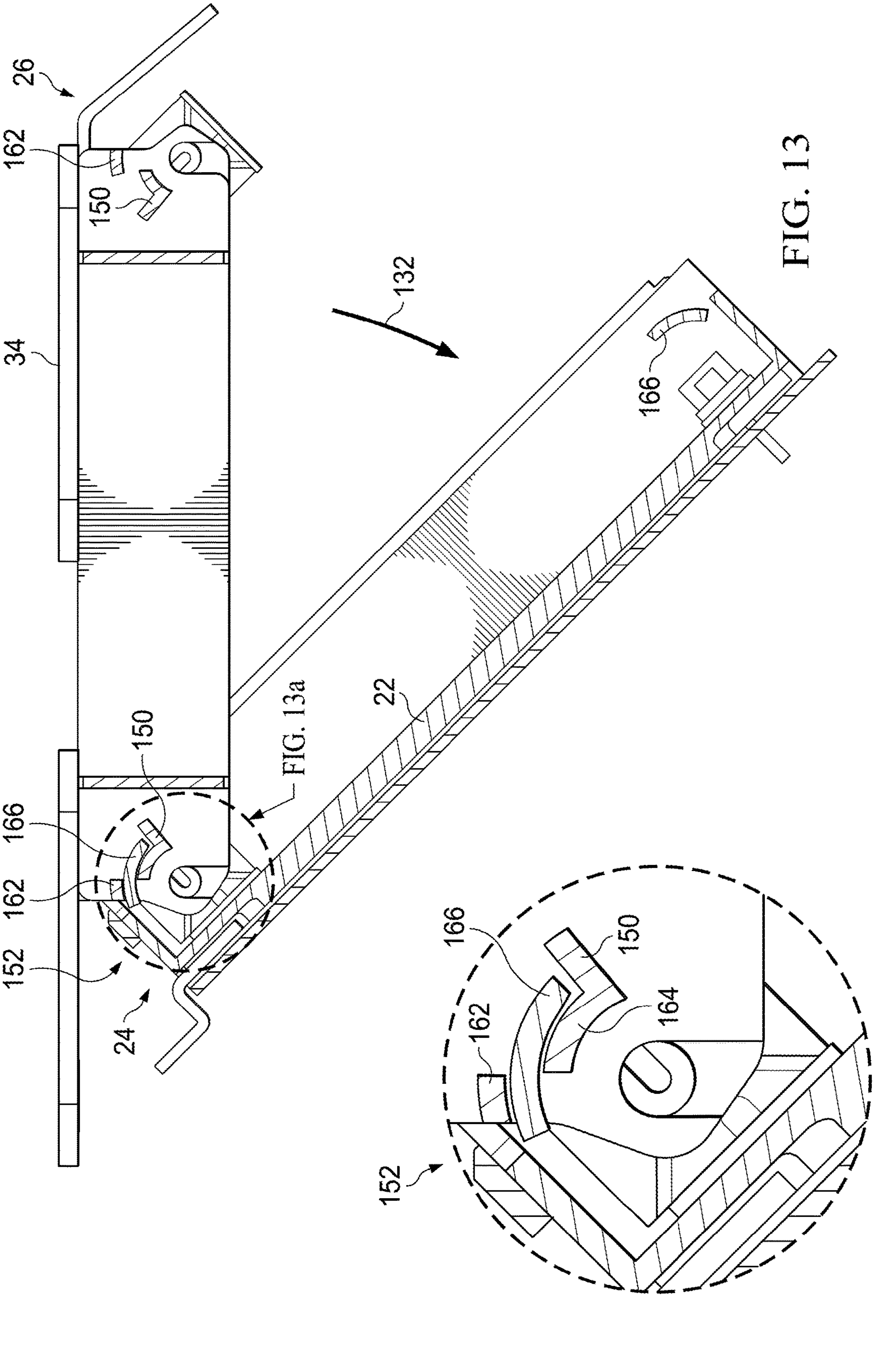

Referring now to FIGS. 12-14, with detailed views shown as FIG. 12*a*, FIG. 12*b*, FIG. 13*a*, and FIG. 14*a*, the first and second ends 24 and 26 each optionally include a rotation stop 150 and a retention system 152 for preventing over rotation of and separation of the chute member 22 from the fire suppression system 12. In the embodiment illustrated in FIGS. 12-14 rotation stops 150 are formed or otherwise disposed on the base sidewalls 42 and 44 to limit the rotation of the chute member 22. In addition, base upper guides 162 and base lower guides 164 are also formed on or otherwise disposed on the sidewalls 42 and 44 of the base 20. Corresponding retaining guides 166 are located on the chute member sidewalls 50*a* and 50*b* and are positioned between and slideably engage the base upper and lower guides 162 and 164 on the base member 20. In use, the base upper and lower guides 162 and 164, in addition to providing a guide for rotation of the chute member 22, the base upper and lower guides 162 and 164 prevent separation of the chute member 22 from the base member 20 in the event that both actuation devices 120*a* and 120*b* actuate.

FIGS. 13 and 14 illustrate the rotation of the chute member 22. In FIG. 13, as the chute member 22 rotates so as to extinguish a fire on the rear burner 17, the base upper and lower guides 162 and 164 disposed at the first end 24 engage the corresponding retaining guides 166. The chute member 22 rotates in the direction of arrow 132 until the retaining guides 166 contact rotation stops 150, at which point rotation stops. This also prevents separation of the chute member 22 from the base member 20.

Referring to FIG. 14, as the chute member 22 rotates to the front open position to dispense the fire suppression powder 36 on the front burner, the base upper and lower guides 162 and 164 disposed on the second end 26 engage the corresponding retaining guides 166 on the base member 20. The chute member 22 rotates in the direction of arrow 134 until the retaining guides 166 contact the rear rotation stops 150. This prevents further rotation and prevents separation of the chute member 22 from the base member 20.

Turning to FIG. 15, an embodiment of the fire suppression system 12 is illustrated having an end cap or cover 190 position to cover the first end 24. According to embodiments disclosed herein, the cover 190 is secured to the fire suppression system 12 via a snap/friction fit, an adhesive or any other method, such as screws, that can securely fasten the cover 190 to the fire suppression system 12. According to some embodiments, the cover 190 can be sized to extend around the sides of the fire suppression system 12, can have a height greater than the height of the fire suppression system 12, and further, a single cover can extend between multiple fire suppression systems 12 when mounted to an overhead support surface 16. The cover 190 is optional and functions to provide an aesthetic appearance to the suppression system 12.

FIGS. 16 and 17 illustrate another embodiment of the fire suppression system 12 in which the base member 20 is formed having a varying height. For example, the base member 20 varies in height from the first end 24 to the second end 26. In FIGS. 16 and 17, the height of the base 20 member gradually increases from the first end 24 to the second end 26 forming a wedge shape appearance. Significant advantages result from this wedge shape. For example, the width W of the fire suppression system 12 can be narrowed in this embodiment (as compared to the embodiment illustrated in FIGS. 1-15) so as to store the same volume of powder 36 inside the storage area 28. In addition, because an increased volume of powder 36 is stored closer to the second end 26 rather than evenly distributed between the first and second ends 24 and 26, the center of gravity of the fire suppression system 12 is closer to the second end 26. This is important in situations where the magnets 32 closer to the first end 24 are unable to attach to an overhead support structure 16. For example, referring to FIG. 18, oftentimes the forward undersides of a microwave includes a recessed portion 16*a* to enable unobstructed viewing of the cooking surface 18. As a result, a suitable surface is not available for engagement with the magnets 32 located toward the first end 24. Because the center of gravity is rearward and closer to the second end 26, the magnets 32 closer to the second end 26 are able to support the fire suppression system 12 and resist the moment in the direction of arrow 192 since the moment is reduced due to a lesser amount of powder, and thus weight, cantilevering away from the support structure 16. Furthermore, by having a narrower profile due to the wedge shape, to the extent the fire suppression system 12 covers a vent or light on the bottom of the microwave, the narrower profile will reduce the total overlap. In addition to the above, by having the center of gravity closer to the second end, as the system 12 transitions to the dispensing position, the release of powder 36 occurs in a more controlled fashion, especially as the chute 22 and extension 23 are fully extended.

It should be understood that the size of the fire suppression system 12 may vary. For example, the length L is approximately 6 inches and the width W is approximately 5 inches. However, it should be understood that these lengths may be different depending on the size of the stovetop cooking surface 18, including the position of burners 15 and 17, and the size of the overhead support surface 16. For example, according to some embodiments, the length L may be selected between and including a range between 5 inches and 12 inches. And the width W may be selected between and including a range between 2 inches and 6 inches. It should be understood that in other embodiments, the length L and width W may be outside of these ranges. Furthermore, the height H1 is about 1.5 inches, however, it should be understood that height H1 may be otherwise (i.e., taller or shorter). Referring to FIGS. 17 and 18, in some embodiments, the height of the wedge shaped base 20 at the first end 24 is 1.5 inches and the height H2 at the second end is 2.25 inches, although the heights at both ends 24 and 26 may be different (i.e., taller or shorter).

Referring now to FIGS. 19-23, a stovetop support system 100 is employed to secure the fire suppression device 12 to an adjacently position wall or other support surface 101, rather than the underside of the microwave 16, such that the suppression device is disposed above the stovetop 18. Referring specifically to FIGS. 21 and 22, the wall support system 100 includes a base member 102 to be secured to the wall and a bracket member 104 configured to extend and otherwise cantilever outward from the base member 104. In the embodiment illustrated in FIGS. 21 and 22, the bracket member 104 is removably attachable to the base member 102 via an arm 106 that cantilevers outward from the base member 102. Referring specifically to FIG. 22, the connector arm 106 is formed integrally with the base member 102 and the bracket member 104 is removably detachable to the arm 106. However, it should be understood that the wall support system 100 may be otherwise formed. For example, the wall support system 100 may be a single unitary piece attachable to the wall, or the bracket member 104 can be integrally formed with the connector arm 106.

Referring specifically to FIG. 22, the fire suppression device 12 is configured to be secured to the bracket member 104 via a plurality of screws 108. In the embodiment illustrated in FIGS. 22 and 23, four screws 108 are used to secure the fire suppression device 12 to the bracket 104; however, it should be understood that a greater or fewer number of screws 108 can be used. During installation openings 120 on the fire suppression device are aligned with corresponding openings on the bracket 104 so as to secure the fire suppression device 12 to the bracket 104 via the screws 108. It should be further understood that other attachment mechanisms may be used. For example, one or more magnets (not illustrated) could be used to secure the fire suppression device 12 to the wall support system 100. In other embodiments, an adhesive may be used.

With continued reference to FIG. 22, the position of the bracket 104 may be adjusted toward or away from the wall in the direction of arrows 110 via a slot 112. In the embodiment illustrated in FIG. 22, the slot 112 is formed on the bracket 104; however, the slot 112 may be formed on the arm 106 or on both the bracket 104 and the arm 106. Regardless of the configuration, a screw 114 can be used to adjust and secure the bracket 104 relative to the arm 106 so as to adjust the position of the fire suppression device 12 over the stovetop 18 (FIG. 1).

According to other embodiments, the wall support system 100 may be integrally formed with the fire suppression device 12. For example, the wall support system 100 may extend from a rear wall 118 of the first suppression device 12 to facilitate securing the fire suppression device to the wall.

Embodiments disclosed in FIGS. 19-23 enable the fire suppression device to be mounted above the stovetop cooking surface 18 without interfering with vents, lighting and having to accommodate irregular mounting surfaces oftentimes occur with overhead support structures 16 such as microwaves and vent hoods.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word “comprising” is to be understood in its “open” sense, that is, in the sense of “including”, and thus not limited to its “closed” sense, that is the sense of “consisting only of”. A corresponding meaning is to be attributed to the corresponding words “comprise”, “comprised” and “comprises” where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A stovetop fire suppression system for selectively releasing a fire suppressant powder onto a stovetop first or second burner, the stovetop fire suppression system comprising:

a base member and a chute member secured to the base member at opposed first and second ends of the base member, the chute member movable between a storage position, whereby the chute member and the base member form a storage area for storing the fire suppressant powder therein, and a dispensing position, whereby the chute member is positioned to release the fire suppressant powder from the storage area;

a first heat sensitive member disposed at the base section first end;

a second heat sensitive member disposed at the base section second end; and wherein in response to actuation of the first heat sensitive member being exposed to a pre-determined temperature, the chute member is movable to the dispensing position to release the fire suppressant powder onto the first burner, and in response to actuation of the second heat sensitive member being exposed to the pre-determined temperature, the chute member is movable to the dispensing position to release the fire suppressant powder onto the second burner.

2. The stovetop fire suppression system of claim 1, wherein the chute member is pivotably secured to the base member at a base member first end and a base member second end.

3. The stovetop fire suppression system of claim 1, further comprising an extension member extending from the chute member in response to the second heat sensitive member being exposed to the pre-determined temperature to dispense the fire suppressant powder onto the second burner.

4. The stovetop fire suppression system of claim 3, wherein the extension member telescopingly extends from the chute member.

5. The stovetop fire suppression system of claim 1, further comprising a metering bar extending laterally across the chute member to control the flow of the fire suppressant powder onto the applicable first or second burner.

6. The stovetop fire suppression system of claim 1, further comprising a plurality of support arms secured to the base member for securing the fire suppression system to an overhead support structure disposed above the first and second burners.

7. The stovetop fire suppression system of claim 6, wherein the plurality of support arms are pivotably secured to the base member.

8. The stovetop fire suppression system of claim 6, wherein the overhead support structure is a microwave oven or a vent hood.

9. The stovetop fire suppression system of claim 6, wherein the plurality of support arms further include a magnet for securing the suppression system to an overhead support surface.

10. A stovetop fire suppression system for selectively releasing a fire suppressant powder onto a stovetop first or second burner, the stovetop fire suppression system comprising:
- a base member having a top wall, a front wall, a rear wall, and a pair of sidewalls extending between the front and rear walls;
- a chute member secured to the base member, the base member and the chute member forming a storage area for storing the fire suppressant powder;
- a first hinge rotatably secured to the base member adjacent the base member front wall and a second hinge rotatably secured to the base member adjacent the base member rear wall, the chute member secured to the first hinge and the second hinge at each respective end of the chute member;
- a first heat sensitive member disposed adjacent the base section front wall and a second heat sensitive member disposed adjacent the base section rear wall; and
- wherein in response to the first heat sensitive member being exposed to a pre-determined temperature, the chute member moves to the dispensing position to release the fire suppressant powder onto the first burner, and in response to of the second heat sensitive member being exposed to the pre-determined temperature, the chute member moves to the dispensing position to release the fire suppressant powder onto the second burner.

11. The stovetop fire suppression system of claim 10, wherein the heat sensitive members include a fuse, a charge cup and a charge cap, the charge cup and the charge cap forming an interior area to receive a portion of the fuse, such that upon actuation of the actuation member, the charge cup separates from the charge cap.

12. The stovetop fire suppression system of claim 10, further comprising an extension member extending from the chute member in response of to the second heat sensitive member being exposed to the pre-determined temperature to dispense the fire suppressant powder onto the second burner.

13. The stovetop fire suppression system of claim 12, wherein the extension member telescopingly extends from the chute member.

14. The stovetop fire suppression system of claim 10, wherein the chute member further comprises a pair of sidewalls and at least one metering bar extending laterally across the chute member to control the flow of fire suppressant powder onto the applicable first burner or the second burner.

15. The stovetop fire suppression system of claim 10, further comprising at least one retaining arm pivotably secured to the base member for securing the fire suppression system to a support surface disposed above the first and second burners.

16. The stovetop fire suppression system of claim 15, wherein the at least one retaining arm further includes a magnet for securing the fire suppression system to the support surface.

17. The stovetop fire suppression system of claim 10, wherein a height of the base member at the second end is greater than the height of the base member at the first end.

18. The stovetop fire suppression system of claim 17, wherein the height of the base member at the second end is 2.25 inches.

19. A stovetop fire suppression system for selectively releasing a fire suppressant powder onto a stovetop burner, the stovetop fire suppression system comprising:
- a base member having a first end and an opposed second end;
- a chute member having a bottom wall and rotatably secured adjacent the base member first end, the chute member and the base member forming a storage area for storing the fire suppressant powder;
- an extension member having a bottom wall and slidably engaged with the chute member;
- a heat sensitive member disposed adjacent the base member second end; and
- wherein in response to the heat sensitive member being exposed to a pre-determined temperature, the chute member rotates from a storage position to a dispensing position and the extension member slidably and telescopingly extends from the chute member such that the bottom wall of the extension member and the bottom wall of the chute member are disposed adjacent to each other and form an extended and continuous ramp extending from the chute member to direct and release the fire suppressant powder onto the stovetop burner.

20. The stovetop fire suppression system of claim 19, wherein the chute member further comprises a pair of sidewalls and at least one metering bar extending laterally across the chute member to control the flow of fire suppressant powder.

* * * * *